United States Patent
Ohta et al.

(10) Patent No.: US 11,765,700 B2
(45) Date of Patent: Sep. 19, 2023

(54) WIRELESS TERMINAL, WIRELESS BASE STATION, WIRELESS COMMUNICATION SYSTEM, AND WIRELESS COMMUNICATION METHOD RELATED TO RADIO RESOURCE ALLOCATION WITHIN A COMMUNICATION PERIOD

(71) Applicant: FUJITSU LIMITED, Kawasaki (JP)

(72) Inventors: Yoshiaki Ohta, Yokohama (JP); Yoshihiro Kawasaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 354 days.

(21) Appl. No.: 14/741,974

(22) Filed: Jun. 17, 2015

(65) Prior Publication Data
US 2015/0289268 A1   Oct. 8, 2015

Related U.S. Application Data

(63) Continuation of application No. PCT/JP2012/008141, filed on Dec. 19, 2012.

(51) Int. Cl.
*H04W 72/0446* (2023.01)
*H04W 4/70* (2018.01)
(Continued)

(52) U.S. Cl.
CPC ......... *H04W 72/0446* (2013.01); *H04W 4/70* (2018.02); *H04W 72/23* (2023.01); *H04W 72/51* (2023.01)

(58) Field of Classification Search
None
See application file for complete search history.

(56) References Cited

U.S. PATENT DOCUMENTS 9,363,797 B2 *  6/2016  Freda ................ H04W 72/0406
2009/0252143 A1 * 10/2009  Sridhara ............... H04L 1/1685
                                                              370/345
(Continued)

FOREIGN PATENT DOCUMENTS

CN    102026410 A    4/2011
CN    102264134 A    11/2011
(Continued)

OTHER PUBLICATIONS

Extended European search report with the supplementary European search report and the European search opinion issued for corresponding European Patent Application No. 12890369.7 dated Nov. 27, 2015.
(Continued)

*Primary Examiner* — Robert C Scheibel
(74) *Attorney, Agent, or Firm* — Myers Wolin, LLC

(57) ABSTRACT

A wireless terminal including: a memory, and a processor coupled to the memory and configured to: communicate with a wireless base station using a wireless signal that is divided into sequential time segments, receive first information from the wireless base station, the first information including a length of a period for periodic wireless communication that is performed using the wireless signal, the length of the period being a specified number of time segments in the sequential time segments, and perform the periodic wireless communication with the wireless base station based on the first information, wherein the first information includes second information indicating at least one time segment within the period for the periodic wireless communication, the indicated at least one time segment in which a radio resource for the periodic wireless communication is allocated for the wireless terminal.

20 Claims, 22 Drawing Sheets

(51) Int. Cl.
H04W 72/23 (2023.01)
H04W 72/51 (2023.01)

(56) References Cited

U.S. PATENT DOCUMENTS

| | | | | |
|---|---|---|---|---|
| 2010/0111026 A1* | 5/2010 | Hsu | ................. | H04L 1/1893 |
| | | | | 370/329 |
| 2010/0118807 A1* | 5/2010 | Seo | ................ | H04W 72/042 |
| | | | | 370/329 |
| 2011/0064405 A1 | 3/2011 | Rajagopal et al. | | |
| 2011/0164584 A1* | 7/2011 | Seo | ................ | H04W 72/042 |
| | | | | 370/329 |
| 2011/0223924 A1* | 9/2011 | Lohr | ............... | H04W 72/042 |
| | | | | 455/450 |
| 2011/0292916 A1 | 12/2011 | Shirakabe et al. | | |
| 2013/0148616 A1 | 6/2013 | Takano | | |
| 2013/0294247 A1* | 11/2013 | Zhu | ............... | H04W 72/0486 |
| | | | | 370/235 |
| 2013/0315115 A1* | 11/2013 | Kim | ................ | H04J 11/0056 |
| | | | | 370/280 |
| 2013/0343265 A1* | 12/2013 | Ehsan | ............. | H04J 3/0632 |
| | | | | 370/328 |
| 2014/0023008 A1* | 1/2014 | Ahn | ................ | H04W 76/023 |
| | | | | 370/329 |
| 2014/0105164 A1* | 4/2014 | Moulsley | .......... | H04W 72/042 |
| | | | | 370/329 |
| 2014/0105191 A1* | 4/2014 | Yang | ............. | H04L 1/1867 |
| | | | | 370/336 |
| 2014/0201586 A1* | 7/2014 | Pajukoski | ........... | H04L 1/0083 |
| | | | | 714/748 |
| 2015/0245326 A1* | 8/2015 | Rune | ................ | H04L 1/0003 |
| | | | | 370/329 |
| 2015/0257144 A1* | 9/2015 | Hooli | .............. | H04W 72/0406 |
| | | | | 370/329 |
| 2015/0282126 A1* | 10/2015 | Park | ................ | H04L 5/0091 |
| | | | | 370/329 |

FOREIGN PATENT DOCUMENTS

| | | |
|---|---|---|
| CN | 102647718 A | 8/2012 |
| EP | 0 977 370 A1 | 2/2000 |
| EP | 1 850 508 A2 | 10/2007 |
| EP | 2 141 839 A1 | 1/2010 |
| EP | 2 257 112 A1 | 12/2010 |
| EP | 2 525 510 A2 | 11/2012 |
| GB | 2 279 207 A | 12/1994 |
| JP | 2010-519793 A | 6/2010 |
| JP | 2011-259440 A | 12/2011 |
| JP | 2012-080415 A | 4/2012 |
| JP | 2012-209960 A | 10/2012 |
| JP | 2012-231487 A | 11/2012 |
| KR | 10-2006-0013729 A | 2/2006 |
| WO | 2008/097965 A2 | 8/2008 |
| WO | 2009/051445 A2 | 4/2009 |
| WO | 2011/078524 A2 | 6/2011 |

OTHER PUBLICATIONS

Notice of Preliminary Rejection issued for corresponding Korean Patent Application No. 10-2015-7015882 dated Jan. 14, 2016 with a full English translation.
3GPP TS36.211 V11.0.0; "3rd Generation Partnership Project; Technical Specification Group Radio Access Network; Evolved Universal Terrestrial Radio Access (E-UTRA); Physical Channels and Modulation (Release 11)", Sep. 2012.
3GPP TS36.212 V11.0.0; "3rd Generation Partnership Project; Technical Specification Group Radio Access Network; Evolved Universal Terrestrial Radio Access (E-UTRA); Multiplexing and channel coding (Release 11)", Sep. 2012.
3GPP TS36.213 V11.0.0; "3rd Generation Partnership Project; Technical Specification Group Radio Access Network; Evolved Universal Terrestrial Radio Access (E-UTRA); Physical layer procedures (Release 11)", Sep. 2012.
3GPP TS 36.321 V11.0.0 "3rd Generation Partnership Project; Technical Specification Group Radio Access Network; Evolved Universal Terrestrial Radio Access (E-UTRA); Medium Access Control (MAC) protocol specification (Release 11)", Sep. 2012.
3GPP TS 36.331 V11.1.0 "3rd Generation Partnership Project; Technical Specification Group Radio Access Network; Evolved Universal Terrestrial Radio Access (E-UTRA); Radio Resource Control (RRC); Protocol specification (Release 11)", Sep. 2012.
International Search Report issued for corresponding International Patent Application No. PCT/JP2012/008141, dated Jan. 29, 2013.
Written Opinion of the International Searching Authority issued for corresponding International Patent Application No. PCT/JP2012/008141, dated Jan. 29, 2013, with a partial English translation.
Decision of Refusal issued by the Japan Patent Office for corresponding Japanese Patent Application No. 2014-552757, dated Apr. 4, 2017, with an English translation.
Office Action issued by European Patent Office for corresponding European Patent Application No. 12890369.7 dated Feb. 1, 2017.
Notice of Final Rejection issued for corresponding Korean Patent Application No. 10-2015-7015882 dated Nov. 24, 2016 with a full English translation.
First Notification of Office Action issued by the State Intellectual Property Office of China for corresponding Chinese Patent Application No. 201280077718.X, dated Oct. 23, 2017, with an English translation.
Communication pursuant to Article 94(3) EPC issued by the European Patent Office for corresponding European Patent Application No. 12 890 369.7-1215, dated Feb. 13, 2018.
Notification of Reasons for Refusal issued by the Japan Patent Office for corresponding Japanese Patent Application No. 2017-131090, dated Aug. 21, 2018, with an English translation.
Second Notification of Office Action issued by the State Intellectual Property Office of China for corresponding Chinese Patent Application No. 201280077718.X, dated May 16, 2018, with an English translation.
Decision of Dismissal of Amendment issued for corresponding Japanese Patent Application No. 2017-131090, dated Aug. 6, 2019, with Full English Machine Translation attached.
Communication pursuant to Article 94(3) EPC issued by the European Patent Office for corresponding European Patent Application No. 12 890 369.7, dated Mar. 25, 2020.
Notification of Reasons for Refusal issued by the Japan Patent Office for corresponding Japanese Patent Application No. 2019-201850, dated Sep. 1, 2020, with a full English machine translation.
Communication pursuant to Article 94(3) EPC issued by the European Patent Office for corresponding European Patent Application No. 12 890 369.7-1215, dated Jan. 11, 2021.
Decision of Rejection issued by the China National Intellectual Property Administration for corresponding Chinese Patent Application No. 201811284340.6, dated Apr. 18, 2022, with a partial English translation.
Notification of Reexamination issued by the China National Intellectual Property Administration for corresponding Chinese Patent Application No. 201811284340.6, dated Mar. 22, 2023, with a partial English translation.
Notification of Reexamination issued by the China National Intellectual Property Administration for corresponding Chinese Patent Application No. 201811284340.6, dated Oct. 12, 2022, with a partial English translation.
First Notification of Office Action and Search Report issued by the China National Intellectual Property Administration for corresponding Chinese Patent Application No. 201811284340.6, dated Jun. 3, 2021, with an English translation.
Communication pursuant to Article 94(3) EPC issued by the European Patent Office for corresponding European Patent Application No. 12 890 369.7-1215, dated Feb. 2, 2022.
Second Notification of Office Action issued by the China National Intellectual Property Administration for corresponding Chinese Patent Application No. 201811284340.6, dated Dec. 13, 2021, with a partial English translation.

(56) References Cited

OTHER PUBLICATIONS

Decision of Reexamination issued by the China National Intellectual Property Administration for corresponding Chinese Patent Application No. 201811284340.6, dated Jun. 27, 2023, with a partial English translation.

* cited by examiner

Related Art

Related Art

Related Art

Related Art

FIG. 8

```
SPS-ConfigUL ::= CHOICE {
    release NULL,
    setup SEQUENCE {
        semiPersistSchedIntervalUL ENUMERATED {
            sf10, sf20, sf32, sf40, sf64, sf80,
            sf128, sf160, sf320, sf640, spare6,
            spare5, spare4, spare3, spare2,
            spare1},
        implicitReleaseAfter ENUMERATED {e2, e3, e4, e8},
        p0-Persistent SEQUENCE {
        p0-NominalPUSCH-Persistent INTEGER (-126..24),
        p0-UE-PUSCH-Persistent INTEGER (-8..7)
        } OPTIONAL, -- Need OP
        twoIntervalsConfig ENUMERATED {true} OPTIONAL, -- Cond TDD
        ...
    }
}
```

FIG. 9

```
SPS-ConfigUL ::= CHOICE {
    release NULL,
    setup SEQUENCE {
        semiPersistSchedIntervalUL ENUMERATED {
            sf10, sf20, sf32, sf40, sf64, sf80,
            sf128, sf160, sf320, sf640, spare6,
            spare5, spare4, spare3, spare2,
            spare1},
        semiPersistSchedTransmissionPeriodUL ENUMERATED {
            sf1, sf2, sf4, sf8, sf16, sf32, sf64, sf128},
        implicitReleaseAfter ENUMERATED {e2, e3, e4, e8},
        p0-Persistent SEQUENCE {
        p0-NominalPUSCH-Persistent INTEGER (-126..24),
        p0-UE-PUSCH-Persistent INTEGER (-8..7)
        } OPTIONAL, -- Need OP
        twoIntervalsConfig ENUMERATED {true} OPTIONAL, -- Cond TDD
        ...
    }
}
```

FIG. 10A

|  | DCI FORMAT 0 (ACTIVATION) | DCI FORMAT 0 (RELEASE) |
|---|---|---|
| NDI | 0 | 0 |
| TPC command for scheduled PUSCH | set to '00' | set to '00' |
| Cyclic shift DM RS | set to '000' | set to '000' |
| Modulation and coding scheme and redundancy version | MSB is set to '0' | set to '11111' |
| Resource block assignment and hopping resource allocation | N/A | Set to all '1's |

FIG. 10B

|  | DCI FORMAT 1/1A (ACTIVATION) | DCI FORMAT 2/2A/2B/2C (ACTIVATION) | DCI FORMAT 0 (RELEASE) |
|---|---|---|---|
| NDI | 0 | 0 | 0 |
| HARQ process number | FDD:set to '000' TDD:set to '0000' | FDD:set to '000' TDD:set to '0000' | FDD:set to '000' TDD:set to '0000' |
| Modulation and coding scheme | MSB is set to '0' | For the enabled transport block MSB is set to '0' | set to '11111' |
| Redundancy version | set to '00' | For the enabled transport block MSB is set to '00' | set to '00' |
| Resource block assignment | N/A | N/A | Set to all '1's |

1

WIRELESS TERMINAL, WIRELESS BASE STATION, WIRELESS COMMUNICATION SYSTEM, AND WIRELESS COMMUNICATION METHOD RELATED TO RADIO RESOURCE ALLOCATION WITHIN A COMMUNICATION PERIOD

CROSS-REFERENCE TO RELATED APPLICATION

This application is a continuation application of International Application PCT/JP2012/008141 filed on Dec. 19, 2012, the entire contents of which are incorporated herein by reference.

FIELD

The present invention relates to a wireless terminal, a wireless base station, a wireless communication system, and a wireless communication method.

BACKGROUND

In recent years, discussions on next generation wireless communication technologies to further enhance high-speed, high capacity wireless communication, and the like in a wireless communication system such as a mobile phone system (cellular system) have been performed. For example, a communication standard called Long Term Evolution (LTE) and a communication standard called LTE-Advanced (LTE-A) that is based on LTE wireless communication technology have been proposed by the 3rd Generation Partnership Project (3GPP), a standard body.

A recently completed communication standard for 3GPP is Release 10 corresponding to LTE-A, which is a major functional enhancement of Release 8 and Release 9 that correspond to LTE. At present, discussions are in progress regarding completion of Release 11 that is a further enhancement of Release 10. "LTE" is hereinafter defined as including other wireless communication systems that are enhancements of LTE, as well as LTE and LTE-A, unless otherwise specified.

Various technologies are included in 3GPP Release 11, and among them is Machine Type Communication (MTC). MTC is equivalent to so-called Machine-to-Machine (M2M) communication in an LTE system, and indicates a type of communication in which machines exchange information without a human being involved. Specific application examples of MTC include monitoring of meters, such as an electricity meter, a gas meter, and a water meter, security monitoring, monitoring of various apparatuses, a sensor network and the like. Furthermore, it is also assumed that electrical apparatuses within a house correspond to MTC, and thus the electrical apparatuses and MTC mutually operate in conjunction with one another. Discussions on MTC in 3GPP have just started, but because it is considered that MTC has applications in very many fields, it is expected that the discussions on MTC as a promising technology in 3GPP will be very active.

CITATION LIST

Patent Literature

PTL 1: Japanese National Publication of International Patent Application No. 2010-519793

PTL 2: Japanese Laid-open Patent Publication No. 2012-80415

Non Patent Literature

NPL 1: 3GPP TS36.211.V11.0.0 (2012-09)
NPL 2: 3GPP TS36.212.V11.0.0 (2012-09)
NPL 3: 3GPP TS36.213.V11.0.0 (2012-09)
NPL 4: 3GPP TS36.321.V11.0.0 (2012-09)
NPL 5: 3GPP TS36.331.V11.1.0 (2012-09)

SUMMARY

According to an aspect of the invention, a wireless terminal includes a memory, and a processor coupled to the memory and configured to: communicate with a wireless base station using a wireless signal that is divided into sequential time segments, receive first information from the wireless base station, the first information including a length of a period for periodic wireless communication that is performed using the wireless signal, the length of the period being a specified number of time segments in the sequential time segments, and perform the periodic wireless communication with the wireless base station based on the first information, wherein the first information includes second information indicating at least one time segment within the period for the periodic wireless communication, the indicated at least one time segment in which a radio resource for the periodic wireless communication is allocated for the wireless terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating one example of an RRC signal in an LTE system in the related art.

FIG. 9 is a diagram illustrating one example of the RRC signal in a wireless communication system according to a second embodiment.

FIGS. 10A and 10B are diagrams illustrating one example of DCI in the wireless communication system according to the second embodiment.

DESCRIPTION OF EMBODIMENTS

Figure 1:
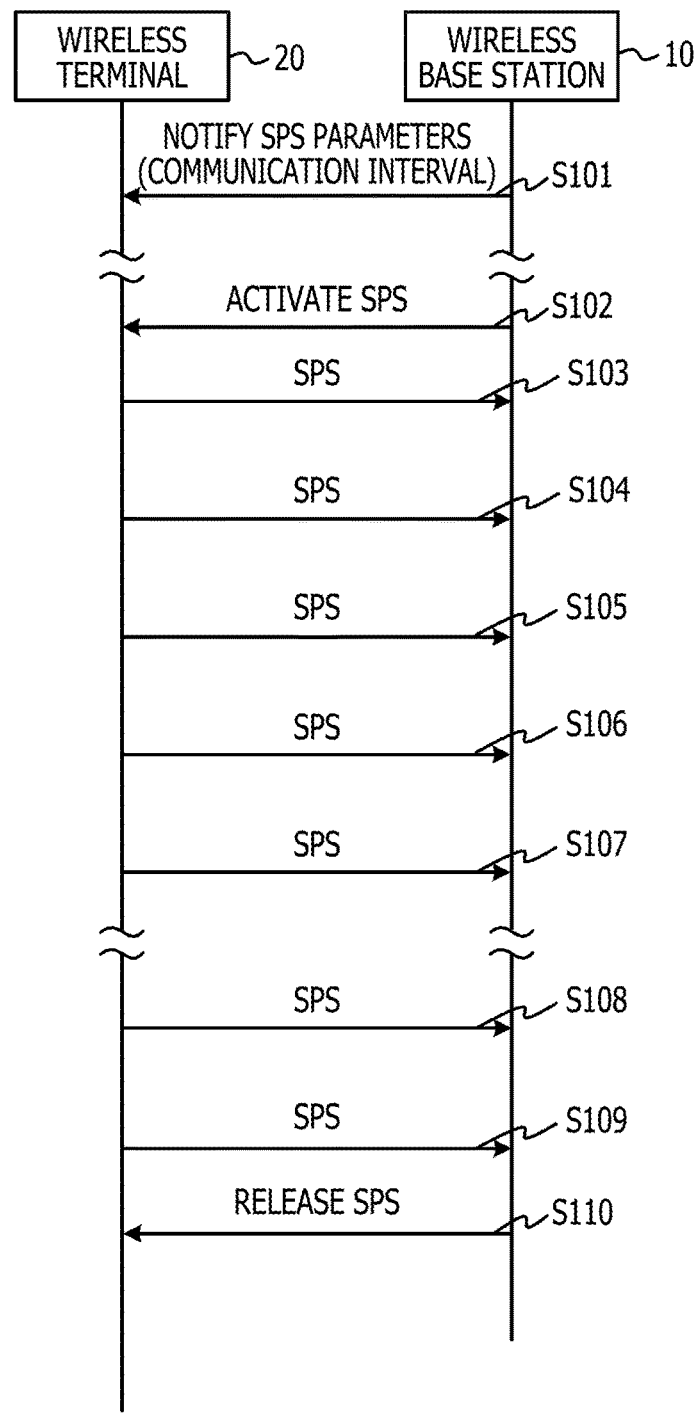
FIG. 1 is a diagram illustrating one example of a sequence of uplink semi-persistent•scheduling processing.

Various devices corresponding to MTC are generally called MTC devices, but it is considered that MTC devices have several features different from those of a general portable telephone terminal (a so-called cellular terminal). For an MTC device, Studies have to be conducted on a change (extension or simplification) to various control tasks or processing tasks that are applied to a general portable telephone terminal, as desired, after considerations based on these different features are made. This is because it is considered that in some cases, when the various control tasks or processing tasks that are applied to a general portable telephone terminal are applied to an MTC device, a harmful effect may occur, or functional redundancy may occur.

However, discussions regarding MTC devices have just started, and the fact is such that a small number of studies have been conducted on the various control tasks and processing tasks that are based on the features of MTC. Particularly, studies on a scheduling scheme that is based on the features of MTC mostly have not advanced. Several scheduling schemes are already stipulated in current LTE systems. However, when considerations are made based on current or future changes in a utility form of the portable telephone terminals that include the MTC device, there is a likelihood that these will not be sufficiently efficient.

Moreover, a description that identifies this problem has been provided based on an MTC device in LTE systems, but the problem occurs in general portable telephone terminals as well. Several scheduling schemes are already stipulated in current LTE systems. However, when considerations are made based on current and future changes in the utility form of a portable telephone terminals that include the MTC device, there is a concern that these will not be sufficiently efficient.

An object of a technology in the present disclosure, which has been developed in view of the problems described above, is to provide a wireless terminal, a wireless base station, a wireless communication system, and a wireless communication method for performing efficient scheduling based on current and future changes in a utility form of a portable telephone terminal.

Referring to the drawings, a wireless terminal, a wireless base station, a wireless communication system, and a wireless communication method according to embodiments will be described below for disclosure. Moreover, for convenience, descriptions are provided according to the individual embodiments, but it goes without saying that combinations of the embodiments can bring out combination effects and an increase in utility.

[Problem Identification]

First, problems with technologies in the related art are described before each embodiment is described. The problems were found as a result of the inventor's close examination of the technologies in the related art, and it is noted that the problems had not been known before this.

As described above, it is considered that an MTC device has several features different from those of a general portable telephone terminal (a so-called cellular terminal). For example, as one feature specific to an MTC device, an MTC device is almost never moved (an MTC device, even if moved, is moved in a very limited manner). There is a case where a general portable telephone terminal is moved at a high speed (is in motion in a high-speed vehicle or so forth), but it is difficult to assume that an MTC device such as an electricity meter or a security sensor will be moved in such a manner.

Because an MTC device is almost never moved, it is considered that the mobility requested for a general portable telephone terminal is not almost requested for an MTC device. For example, there is a likelihood that a handover function will be unnecessary for an MTC device. Here, an examination is provided with focus on scheduling of an MTC device. Here, the scheduling is for allowing the wireless base station to designate radio resources that are used in transmission and reception, a modulation scheme•coding scheme, or the like to wireless terminals (including an MTC device).

When a judgment is made based on the feature that movement almost never occurs, it is considered that there is little purpose in performing so-called dynamic scheduling of an MTC device. Here, dynamic scheduling is scheduling that is dynamically performed each time transmission and reception is performed. In dynamic scheduling in LTE, adaptive modulation and coding (AMC) is employed as an underlying technology. Adaptive modulation and coding is a technology that increases communication efficiency by sequentially selecting the modulation scheme or the coding scheme that is used in data transmission and data reception according to radio quality. Adaptive modulation and coding accomplishes an effect in a case where the radio quality is easy to change, particularly, such as when a wireless terminal is in motion at a high speed. However, because it is considered that an MTC device is almost never moved as described above and the radio quality also is almost uniform, it is considered that the performance of adaptive modulation and coding would be less than with a general portable telephone terminal.

On the contrary, when dynamic scheduling is performed on an MTC device, there is instead a concern that a harmful effect due to occurrence of a lot of signaling (control signals) will occur. Particularly, in a case where uplink data transmission (data transmission from the wireless terminal to the wireless base station) is performed based on dynamic scheduling, a problem occurs. In a case where downlink data transmission (the data transmission from the wireless base station to the wireless terminal) is performed based on dynamic scheduling, because it is possible only to transmit downlink data together with downlink control information (DCI) that is control information for indicating radio resources to which the downlink data is mapped, to the wireless terminal, a problem seldom occurs in terms of an amount of signaling. In contrast, when the wireless base station is not aware of the presence of or an amount of uplink data that the wireless terminal desires to transmit, because it is difficult for the wireless base station to allocate an appropriate number of radio resources, the uplink data transmission is more complicated in terms of processing than the downlink data transmission.

Specifically, in the uplink data transmission that is based on dynamic scheduling, two round trip control signals are transmitted and received between the wireless terminal and the wireless base station each time the data transmission is performed. Specifically, first, the wireless terminal transmits a scheduling request (SR) that is a control signal requesting the uplink data transmission to the wireless base station. Next, the wireless base station transmits to the wireless terminal an initial UL grant with which a predetermined number of uplink radio resources are allocated. Then, based on a predetermined number of uplink radio resources that are allocated with an initial UL grant, the wireless terminal transmits a buffer status report (BSR) indicating an amount of uplink data to the wireless base station. Lastly, the wireless base station determines the radios resources that are allocated to the wireless terminal based on the received BSR and transmits to the wireless terminal the UL grant indicating that the uplink transmission by the wireless terminal is approved based on the radio resources.

In this manner, there has to be much of the signaling particularly in the uplink data transmission that is based on dynamic scheduling. Here, the number of MTC devices is assumed to be greater than that of general portable telephone terminals. For this reason, when dynamic scheduling is conditionally performed on an MTC device, there is a concern that an amount of signaling will be greater in the system. When an amount of signaling is greater, because radio resources that are used in the data transmission and reception are in short supply, increase in the amount of signaling has to be avoided in terms of the efficient use of radio resources. Furthermore, in many cases, reduced power consumption is requested in an MTC device, but when the amount of signaling is greater, because power consumption for processing an amount of signaling is greater, it is considered that the increase in the amount of signaling is not desirable.

On the other hand, in LTE, a scheduling scheme that is called semi-persistent•scheduling (SPS) is stipulated for the dynamic scheduling described above. Like dynamic scheduling, SPS not only dynamically allocates the radio resources each time, but also allocates the radio resources in a semi-persistent manner.

FIG. 1 illustrates one example of a sequence of uplink SPS processing in LTE. Here, the uplink (the wireless communication from a wireless terminal 20 to a wireless base station 10) SPS is described, but in LTE, SPS can be applied to the downlink (the wireless communication from the wireless base station 10 to the wireless terminal 20) as well.

First, in S101 in FIG. 1, the wireless base station 10 notifies the wireless terminal 20 of basic parameters in the SPS. A notification in S101 is transmitted and received with an RRC signal that is a layer 3 (L3) signaling over a Physical Downlink Shared Channel (PDSCH). For example, a communication interval of the SPS and the like are included in SPS parameters that are notified with the RRC signal in S101. The wireless base station 10 can set the communication interval of the SPS in units of subframes (1 msec). Moreover, with the RRC signal in S101, only the basic parameters relating to the SPS are notified, and the transmission and reception that is based on the SPC does not start at a timing that is based on the RRC signal.

Next, the wireless base station 10 in S102 transmits a control signal for activation of the SPS to the wireless terminal 20. The control signal in S102 is transmitted and received with the downlink control information (DCI) that is layer 1 (L1) signaling over a Physical Downlink Control Channel (PDCCH). With the control signal in S102, the SPS of which the basic parameters are set is activated with the RRC signal in S101, and the transmission and reception that is based on the SPS starts. The DCI that is equivalent to the control signal in S102 includes parameters for performing the SPS. The parameters that are included in the DCI include a parameter for designating radio resources corresponding to a Physical Uplink Shared Channel in each subframe in which the transmission that is based on the SPS is performed, a parameter for designation of a modulation and coding scheme (MCS) that is applied to the transmission that is based on the SPS, and the like.

Then, in S103 to S109, the wireless terminal 20 performs the transmission that is based on the SPS over the PUSCH without special signaling being involved. S103 in which there is the initial transmission that is based on the SPS is performed in the fourth or later subframe after a subframe in which the DCI is transmitted and received in S102. Thereafter, in the subframe in every communication interval that is notified with the RRC signal in S101, the wireless terminal 20 performs the transmission to the wireless base station 10, which is based on the SPS, over the PUSCH.

Figure 2:
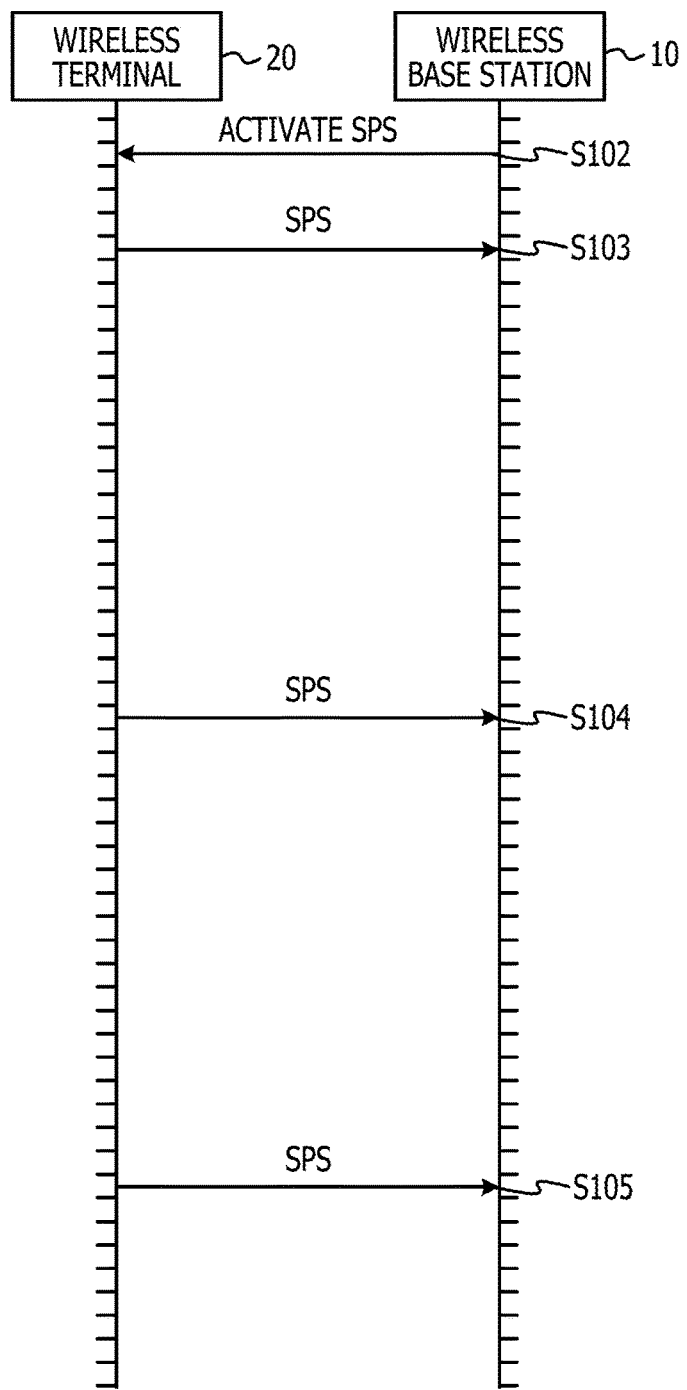
FIG. 2 is a magnified diagram that illustrates one portion of one example of the sequence of the uplink semi-persistent•scheduling processing.

FIG. 2 is a magnified diagram that illustrates portions corresponding to S102 to S105 in FIG. 1. FIG. 2 illustrates one example in which the communication interval of the SPS is 20 subframes. As illustrated in FIG. 2, as described above, S103 in which there is the initial transmission that is based on the SPS is performed in the fourth or later subframe after the subframe in which the DCI is received in S102. Then, thereafter, in each single subframe of every 20 subframes that is the communication interval, the wireless terminal 20 performs the transmission to the wireless base station 10, which is based on the SPS.

Referring back to FIG. 1, the wireless base station 10 in S110 transmits a control signal for releasing the SPS to the wireless terminal 20. In the same manner as in S102, the control signal in S110 is transmitted and received with the DIC over the PDSCH. With the control signal in S110, the SPS activated in S103 is released, and the transmission and reception that is based on the SPS is completed. Accordingly, the transmission that is based on the SPS is not performed after S106. However, in a case where the wireless base station 10 again activates the SPS after S106, the wireless terminal 20 can again start the transmission that is based on the SPS.

Moreover, as one example in FIG. 1, the wireless base station 10 releases the SPS after the transmission that is based on the SPS has been performed seven or more times (counting omissions in the drawings), but the wireless base station 10 can release the SPS at an arbitrary timing. For example, the wireless base station 10 can release the SPS at a time when an application (a VoIP telephone call and the like) that uses the SPS is completed.

Figure 3:
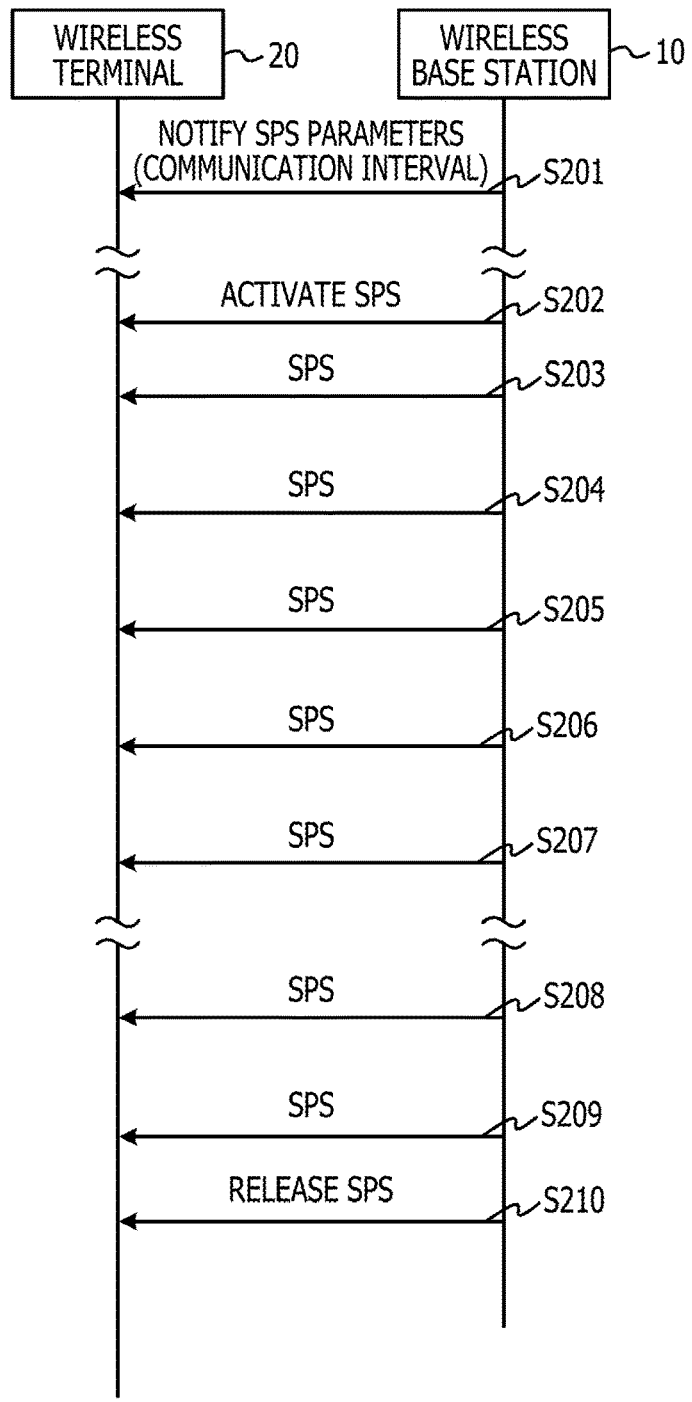
FIG. 3 is a diagram illustrating one example of a sequence of downlink semi-persistent•scheduling processing.
Figure 4:
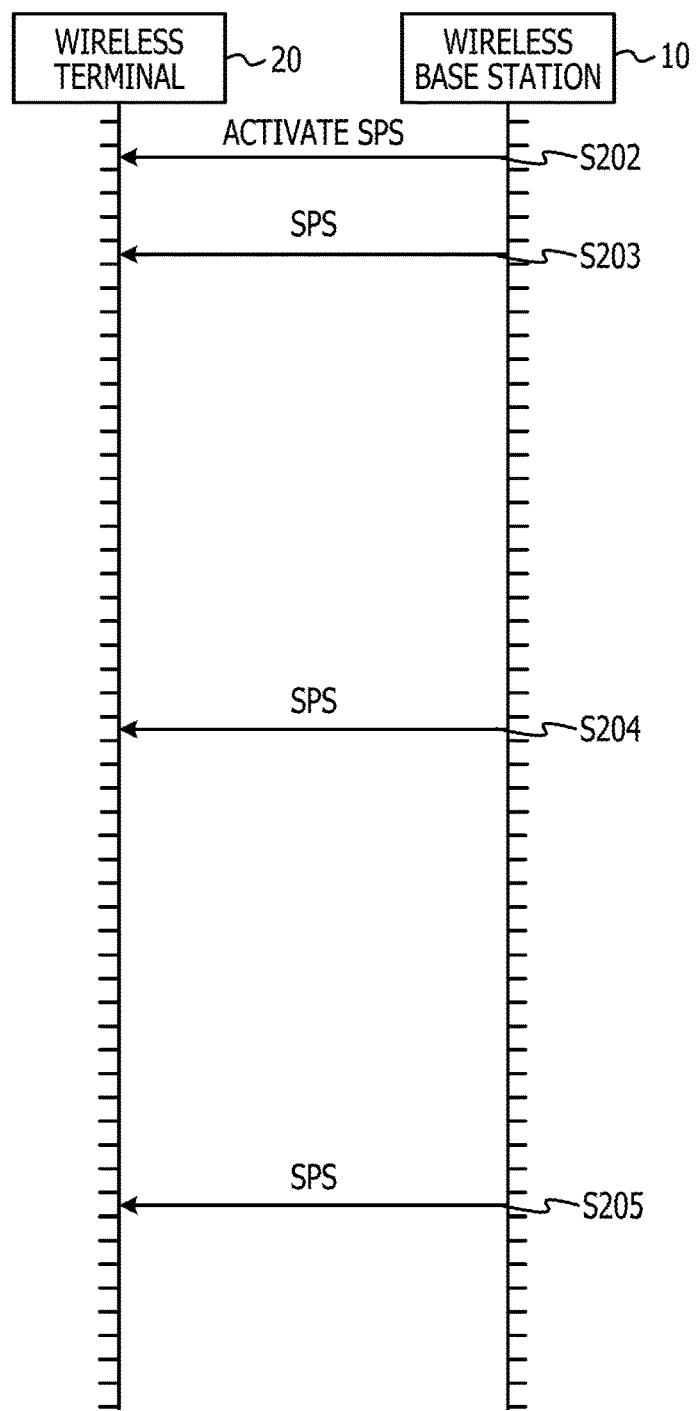
FIG. 4 is a magnified diagram that illustrates one portion of one example of the sequence of the downlink semi-persistent•scheduling processing.

On the other hand, FIG. 3 illustrates one example of a sequence of downlink SPS processing in LTE. Furthermore, FIG. 4 is a magnified diagram that illustrates a portion corresponding to S202 to S205 in FIG. 3. FIGS. 1 and 2 are different from FIGS. 3 and 4 in that, while each transmission (S103 to S109) is performed over the PUSCH in the uplink SPS that is illustrated in FIGS. 1 and 2, each transmission (S203 to S209) is performed over the PDSCH in the downlink SPS that is illustrated in FIGS. 3 and 4.

With the SPS described referring to FIGS. 1 to 4, the signaling for the allocation of the radio resources for every data transmission does not have to be performed like it is performed with the dynamic scheduling. For example, when the transmission, as is illustrated in S103 to S109 in FIG. 1, is performed with the dynamic scheduling, the signaling has to be performed for the allocation of the resources for every transmission in each of S103 to S109. In contrast, in the SPS that is illustrated in FIG. 1, the signaling does not have to be performed for the allocation of the resources for every transmission in each of S103 to S109. The signaling desired in the SPS that is illustrated in FIG. 1 is in S101 and S102 for starting the transmission that is based on the SPS and is in S110 for completing the transmission that is based on the SPS. Therefore, with the SPS, it is possible to suppress an amount of signaling compared with the dynamic scheduling. It is considered that the greater the number of times that the SPS is transmitted (the longer the period during which the SPS is performed), the greater the effect of suppressing the amount of signaling.

On the other hand, demerits are also present in comparison to the dynamic scheduling. Susceptibility to changes in a wireless environment may be given as one example of the demerits of the SPS in comparison to the dynamic scheduling. This demerit is due to the fact that it is difficult to apply the adaptive modulation and coding described above to the SPS. Because the adaptive modulation and coding is realized by designating the MCS in accordance with the wireless environment for every communication, the signaling has to be performed for notifying the MCS for every communication. However, because in the SPS, the signaling is omitted for every communication, it is inherently impossible to apply the adaptive modulation and coding. For this reason, in the SPS, the MCS designated at the time of the activation (S102 in FIG. 1) continues to be used until the MCS is released (S110 in FIG. 1). For this reason, in the SPS, in a case where the wireless environment, for example, deteriorates after the activation, it is difficult to change to the MCS resilient to errors. Therefore, the SPS has a feature of being vulnerable to the changes in the wireless environment. In a case where the changing to the MCS resilient to errors is desired to be made, the re-activation of the SPS has to be performed. At the time of the re-activation of the SPS, like in a case of the activation of the SPS, parameters for performing the SPS are included. The parameters that are included in the DCI include a parameter for designating radio resources corresponding to a Physical Uplink Shared Channel in each subframe in which the transmission that is based on the SPS is performed, a parameter for designation of a modulation and coding scheme (MCS) that is applied to the transmission that is based on the SPS, and the like.

Here, referring back to the scheduling of the MTC device, it is considered that the MTC device has comparatively good comparability with the SPS described above. First, the adaptive modulation and coding is not applied to the SPS as described above, but it is considered that this has a small harmful effect on the MTC device of which the mobility-based radio quality is almost never changed. Furthermore, even though the SPS is for uplink, the signaling is only for the first time and for the last time, and the signaling is not transmitted and received for every uplink data transmission as is done in the dynamic scheduling. Therefore, an amount of signaling that the MTC device transmits and receives can be reduced.

As described above, in a case where the SPS is applied to the MTC device, it is considered that demerits of the SPS have almost no influence on the MTC device and merits of the SPS can be enjoyed. Therefore, the MTC device has good compatibility with the SPS, and it is considered that it is desirable to apply the SPS to the MTC device and perform the scheduling.

Incidentally, the SPS is assumed to be applied to the VoIP and the like in the related art, which are described above. Here, because communication data that is based on the VoIP is sound data, it is considered that an amount of data for every one instance of transmission is not too great.

In contrast, hereinafter, it is assumed that a comparatively large amount of data, such as a moving image or a static image, is transmitted and received in a case where the SPS is applied to the MTC device and the like. As one example, it is considered that the SPS is applied to a monitoring camera that corresponds to the MTC. The monitoring camera transmits to a server an image that is captured with a predetermined period in a predetermined communication interval (for example, 80 msec) that is based on the SPS. In such a case, in the transmission for every SPS, a comparatively large amount of data can be transmitted and received.

Here, in a case where the wireless terminal 20 sends out a comparatively large amount of data, a comparatively large number of radio resources have to be allocated to the wireless terminal 20. When this is realized in the SPS in the related art, a comparatively large number of radio resources have to be allocated in one subframe that is equivalent to a transmission timing in the SPS. In this case, a comparatively large number of radio resources for every one subframe that is equivalent to the transmission timing in the SPS are reserved for a specific wireless terminal 20 in a semi-persistent manner. However, when a comparatively large number of radio resources are allocated to a specific wireless terminal 20 in a future subframe, the flexibility in the allocation of the radio resources in the subframe for a different wireless terminal 20 is reduced. For this reason, this is not favorable.

For example, when many wireless terminals 20 perform the SPS, due to the radio resources for the SPS, a situation may also occur in which certain subframes are in short supply. In such a case, in subframes which are in short supply due to the radio resources for the SPS, it is assumed that it is difficult to cope with occurrence of data transmission with high priority or great urgency other than the SPS occurs. Particularly, taking into consideration that the number of wireless terminals 20 will increase due to MTC devices becoming more widespread in the future, it is considered that as much flexibility in the allocation of radio resources as possible has to be secured.

Furthermore, in addition to the situation described above, it is considered that, for example, like various sensing devices on a sensing network, many MTC devices each have a feature that small amounts of data occur frequently. In such MTC devices, in a one-shot type SPS as illustrated in FIGS. 1 to 4, there is a concern that the allocation of the radio resources will be not sufficient. Furthermore, it is thought that it is possible to apply the one-shot SPS to such MTC devices on the precondition that data that is transmitted is buffered to some extent. However, in most cases, a small-capacity memory is installed in the MTC device, and thus the less capacity the MTC device has, the greater amount of data is difficult to buffer. For this reason, it is considered that compatibility between the MTC device and the one-shot type SPS is not too good.

Moreover, the description is provided above based on the MTC device as an example, but the problems described above are not necessarily limited to the MTC device. It is considered that the problems described above, for example, occur in a normal portable telephone terminal that is used in the same or a similar form as the MTC device.

In summary, in the SPS in the related art, it is considered that a comparatively large amount of data such as image data is not assumed to be transmitted and received. For this reason, when the SPS in the related art is applied to the portable telephone terminal including an MTC device such as a monitoring camera, there is a likelihood that the inconvenience of losing flexibility in the future allocation of the radio resources will occur. Furthermore, because the MTC device has a feature that a small amount of data frequently occurs, this is difficult to cope with in the one-shot type SPS in the related art. This problem as described above was newly found as a result of the inventor's close examination of the technologies in the related art, and it is noted that the problem had not been known before that. Embodiments of the present disclosure for solving the problem are hereinafter sequentially described.

First Embodiment

According to a first embodiment, along with a communication interval for communication that is performed in a predetermined communication interval, the wireless base station 10 designates a communication segment for performing the communication in each communication interval, for the wireless terminal 20. In other words, the first embodiment corresponds to the wireless terminal 20, the wireless communication system including the wireless terminal 20, and the like. The wireless terminal 20 includes a reception unit that receives from the wireless base station first information including the communication interval in the communication that is performed in the communication interval that is comprised of the plurality of segments, and a communication unit that performs communication with the wireless base station based on the first information. The first information includes second information indicating that the communication is performed in a predetermined number of segments among the plurality of segments.

Preconditions for the wireless communication system according to the first embodiment are described. The radio resource that is used by the wireless communication system according to the first embodiment has at least a time component. Here, for convenience, a unit for time components is set to be called a communication segment. The wireless base station 10 and the wireless terminal 20 are set to be able to perform transmission or reception in units of communication segments in the time direction. Moreover, here, "communication segment" is only one example of a term indicating the unit for time components of the radio resource, and although this may be replaced with a term such as a frame, a subframe, a slot, a time slot, or (simply) a segment, it goes without saying that the nature and gist of the invention in the present application is not impaired.

Furthermore, the first embodiment is described based on a case where the invention in the present application is applied to the uplink transmission (the transmission at the communication interval from the wireless terminal 20 to the wireless base station 10) over the communication interval. However, it is noted that the invention in the present application can be also applied in the same manner to the downlink transmission (the transmission over the communication interval from the wireless base station 10 to the wireless terminal 20) over the communication interval.

Figure 5:
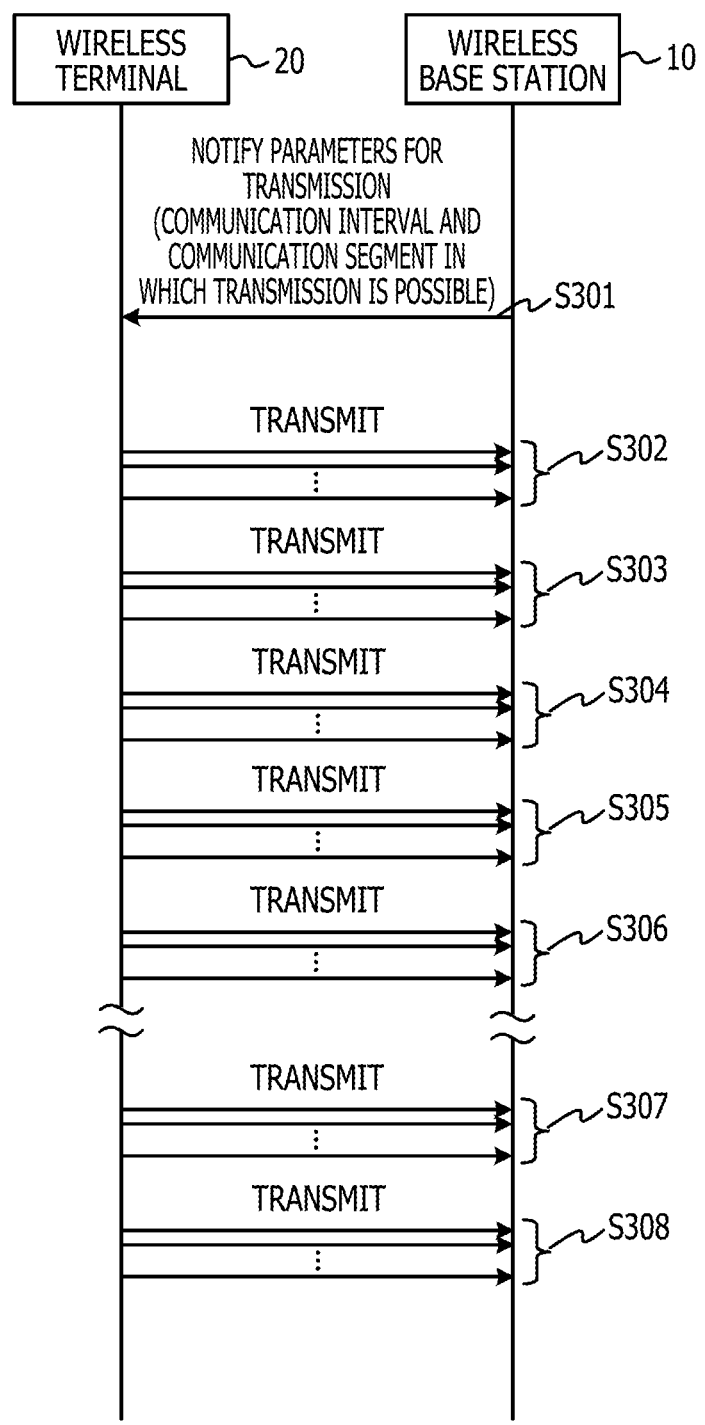
FIG. 5 is a diagram illustrating one example of a sequence of processing by a wireless communication system according to a first embodiment.

FIG. 5 illustrates one example of a sequence of processing by the wireless communication system according to the first embodiment.

The wireless base station 10 in S301 allocates to the wireless terminal 20 the radio resources for the transmission over the communication interval by the wireless terminal 20. The radio resources for the transmission over the communication interval are allocated by the wireless base station 10 transmitting information (for convenience, hereinafter referred to as resource information) indicating the radio resources for the transmission over the communication interval to the wireless terminal 20.

Here, the resource information is set to include at least information indicating the communication interval of the radio resources. The information indicating the communication interval of the radio resources, for example, can be set to be the number of communication segments (to be N that is a positive integer equal to or greater than 2).

Additionally, the resource information is set to be information that includes at least information (for convenience, hereinafter referred to as communication segment indication information) on the communication segment to which the radio resources are allocated in each communication interval (each of the N communication segments). In other words, the communication segment indication information is information indicating the communication segment in which the wireless terminal 20 can perform the transmission in each communication interval (each of the N communication segments). As the communication segment indication information, several examples may be given. For example, in a case where the precondition that, in each communication interval, the radio resources for the transmission over the communication interval are allocated to consecutive communication segments is given, the communication segment indication information can be set to be the number of the consecutive communication segments (is set to be M that is a positive integer equal to or greater than 1, but equal to or smaller than N−1).

On the other hand, without the precondition described above, in each communication interval, the radio resources for the transmission over the communication interval may be allocated to the non-consecutive communication segments as well. As one example in this case, the communication segment indication information can be set to be an N-bit bitmap. In the N-bit bitmap, each bit indicates whether or not the radio resources are allocated to one of the N communication segments that are equivalent to each communication interval. Moreover, in a case where the N-bit bitmap is employed, because a length of the bitmap indicates the communication interval, separate information indicating the communication interval does not have to be included in the resource information.

Furthermore, as the resource information that is transmitted by the wireless base station 10 in S301, information relating to the radio resources that are used in the transmission over the communication interval, other than the information indicating the communication interval described above or the communication segment indication information, may be included. For example, the resource information may include information (for example, frequency information or time information) for specifying the radio resources that are allocated to the communication segment that is indicated with communication segment indication information. Furthermore, the resource information may include information (for example, offset information for the communication segment) indicating a timing of initial transmission in the transmission over the communication interval.

The wireless terminal 20 in each of S302 to S308 performs the transmission to the wireless base station 10 based on the radio resources that have the communication interval allocated in S301. In other words, the wireless terminal 20 in each of S302 to S308 performs the transmission over the communication interval to the wireless base station 10 based on the resource information that is received in S301. Here, as described above, the resource information includes at least the information indicating the communication interval and the communication segment indication information. For this reason, the wireless terminal 20 in each of S302 to S308 performs the transmission over the communication interval to the wireless base station 10 in the communication segment that is specified with the information indicating the communication interval and with the communication segment indication information that are included in the resource information which is received in S301.

Figure 6:
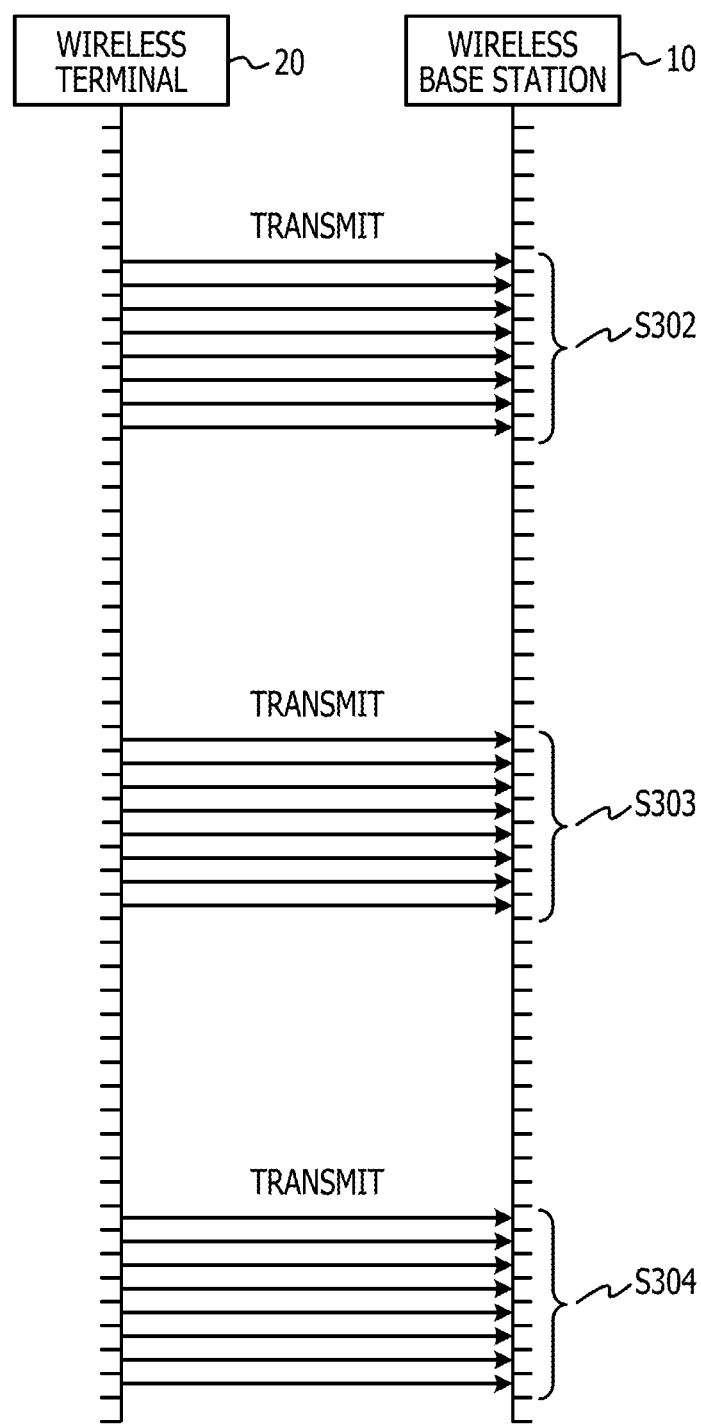
FIG. 6 is a magnified diagram that illustrates one portion of one example of the sequence of the processing by the wireless communication system according to the first embodiment.

FIG. 6 is a magnified diagram that illustrates a portion corresponding to S302 to S304 in FIG. 5. FIG. 6 illustrates a case where, in the transmission that is performed by the wireless terminal 20, a communication interval N is 20 communication segments, as one example. Furthermore, FIG. 6 illustrates a case where the number M of consecutive communication segments that is indicated by the communication segment instruction information is 8, on the precondition that the radio resources for the communication are arranged in the consecutive communication segments in each transmission interval, as one example. At this time, as illustrated in S302 to S304 in FIG. 6, in the communication interval that is configured from the 20 communication segments, the wireless terminal 20 performs the transmission to the wireless base station 10 in consecutive 8 communication segments in each communication interval.

With the wireless communication system according to the first embodiment, when the wireless base station 10 allocates the radio resources for the transmission over the communication interval, it is possible to allocate the radio resources over a plurality of communication segments in each communication interval. Accordingly, it is possible to flexibly allocate the radio resources in the time direction in the transmission over the communication interval.

Accordingly, according to the first embodiment, in a case where the transmission over the communication interval is performed, if a comparatively large amount of data is transmitted in each communication interval, it is possible to divide the communication interval into a plurality of communication segments and transmit comparatively large amount of data in the resulting a plurality of communication segments. For the reason, the number of radio resources that are secured in advance in the plurality of communication segments is small. As a result, in the transmission over the communication interval, in most cases, the radio sources in a certain communication segment are not in short supply, and thus the problem described above can be solved.

Additionally, the first embodiment can be realized without increasing an amount of signaling, compared with the transmission over the communication interval in the related art, which is illustrated in FIG. 1 and the like. Furthermore, according to the first embodiment, the amount of signaling can be decreased to a greater extent than in the transmission over the communication interval in the related art, in terms of the dynamic scheduling. For example, while the signaling has to be performed three times when the transmission in FIG. 2 that illustrates the transmission over the communication interval in the related art is set to be realized with the dynamic scheduling, the signaling has to be performed 24 times when the transmission in FIG. 6 that illustrates the first embodiment is set to be realized with the dynamic scheduling. It can also be understood from this that according to the first embodiment, an effect of decreasing an amount of signaling is great.

In addition to this, according to the first embodiment, each communication interval in which data that has to be sent out is divided into a plurality of communication segments and the data can be transmitted in the resulting a plurality of communication segments. Accordingly, when transmission power is set to be fixed, because the transmission power per bit is relatively higher, coverage is improved. In other words, because the modulation scheme•coding scheme resilient to the error is used, an effect of improving communication characteristics can be accomplished.

Second Embodiment

A second embodiment is an embodiment that corresponds to a case where the invention in the present application is applied to semi-persistent scheduling (SPS) transmission in LTE. To sum up, while the SPS in the related art, which is illustrated in FIGS. 1 to 4, is of a one-shot type, the SPS according to the second embodiment is realized as multi-shot type SPS.

The second embodiment is also described based on the case where the invention in the present application is applied to uplink SPS transmission. However, it is noted that the invention in the present application can be also applied in the same manner to downlink SPS transmission.

Preconditions for a wireless communication system according to the second embodiment are described. The radio resource has the time component and the unit for time components is a subframe (1 msec). The wireless base station 10 and the wireless terminal 20 are set to be able to perform the transmission or the reception in units of subframes in the time direction.

Figure 7:
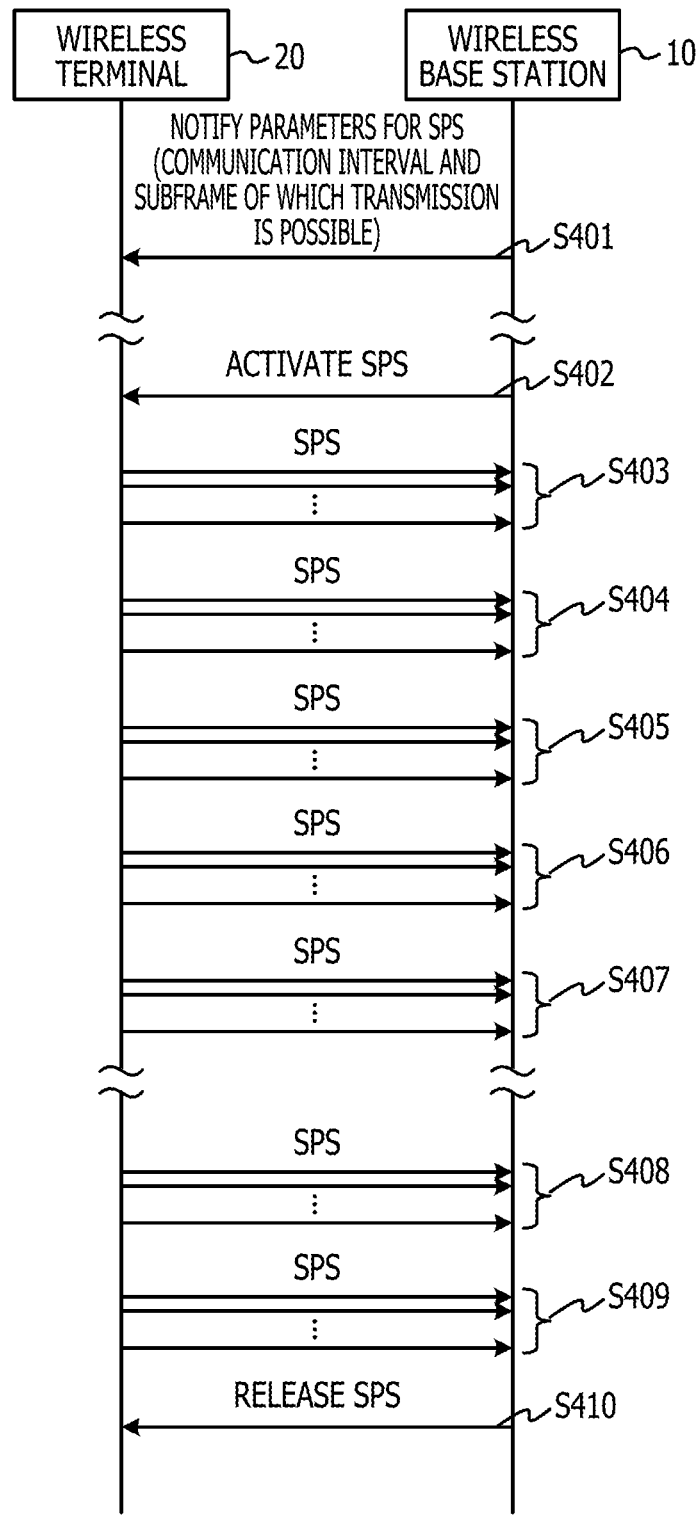
FIG. 7 is a diagram illustrating one example of a sequence of processing by a wireless communication system according to a second embodiment.

FIG. 7 illustrates one example of a sequence of processing by the wireless communication system according to the second embodiment.

In S401, the wireless base station 10 transmits the RRC signal including SPS parameters to the wireless terminal 20. More specifically, an RRCConnectionSetup message, an RRCConnectionReconfiguration message, or an RRCConnectionReestablishment message, which is the RRC signal that the wireless base station 10 transmits to the wireless terminal 20, includes a RadioResourceConfigDedicated information element. Thus, the RadioResourceConfigDedicated information element can include an SPS-Config information element. The SPS-Config information element includes various parameters relating to the SPS. Therefore, in S401, the wireless base station 10 transmits SPS-Config to the wireless terminal 20 in a state of being stored in any one of the RRCConnection setup message, the RRCConnectionReconfiguration message, and the RRCConnectionRestablishment message.

Here, for comparison, first, the SPS-Config information element in an LTE system in the related art is described. First, the SPS-Config information element includes semiPersistSchedC-RNTI, an sps-ConfigDL information element, and an sps-ConfigUL information element, which are parameters. Here, semiPersistSchedC-RNTI is equivalent to an identifier of the wireless terminal 20 in the SPS, and is used when it is determined whether or not the DCI described above is destined for itself. Furthermore, the sps-ConfigDL information element and the sps-ConfigUL information element each include various parameters relating to the downlink SPS and the uplink SPS. A description is provided below based on the sps-ConfigUL information element, but the sps-ConfigDL information element can also be handled almost in the same manner.

FIG. 8 illustrates the sps-ConfigUL information element in the LTE system in the related art in FIG. 8. The SPS-ConfigUL information element includes several parameters relating to the SPS, and one of them, semiPersistSchedulingIntervalUL is a parameter indicating the communication interval of the uplink SPS. It is stipulated that semiPersistSchedulingIntervalUL may have each value of 10, 20, 32, 40, 64, 80, 128, 160, 320, and 640 subframes. Therefore, the wireless base station 10 can notify the wireless terminal 20 of the communication interval of the uplink SPS by transmitting the RRC signal that sets any one of these to be in semiPersistSchedulingIntervalUL.

In contrast, FIG. 9 illustrates the SPS-ConfigUL information element according to the second embodiment. The SPS-ConfigUL information element in FIG. 9 is different from that in FIG. 8, and includes semiPersistSchedulingTransmissionPeriodUL as one of the parameters (an underlined part). Here, semiPersistSchedulingTransmissionPeriodUL is set to be a parameter indicating the number of consecutive subframes of which transmission is possible in each communication interval of the uplink SPS. Here, as one example, in the same manner as described according to the first embodiment, the precondition is provided that the transmission of only the consecutive subframes is possible in each communication interval of the SPS.

As one example, semiPersistSchedulingTransmissionPeriodUL in FIG. 9 is set to be 3-bit information. Furthermore, semiPersistSchedulingTransmissionPeriodUL may be set to indicate 1, 2, 4, 8, 16, 32, 64, and 128 as the number of consecutive subframes of which the transmission is possible in each communication interval of the uplink SPS, using 8 types of values from 000 to 111 that are based on 3 bits.

To sum up, in S401, the wireless base station 10 transmits to the wireless terminal 20 the RRC signal including the information (semiPersistSchedulingIntervalUL) indicating the communication interval of the SPS, and the information (semiPersistSchedulingTransmissionPeriodUL) indicating the number of consecutive subframes of which the transmission is possible in each communication interval of the SPS. On the other hand, the wireless terminal 20 receives the RRC signal that is transmitted by the wireless base station 10.

Next, in S402, the wireless base station 10 transmits to the wireless terminal 20 a control signal for activating the SPS. More specifically, after setting a predetermined value to be in a predetermined parameter that is included in the downlink information (DCI) that is downlink control information, the wireless base station 10 activates the SRS by transmitting the predetermined value to the wireless terminal 20. Here, the activation of the SPS is equivalent to starting of the SPS that is based on a parameter being set in S301.

For the DCI according to the present embodiment, the same DCI as general DCI in LTE can be used. FIGS. 10A and 10B illustrate the DCI according to the present embodiment. For the DCI, several formats are stipulated, and they have different roles. In a case where the uplink SPS is activated, DCI format 0 is used. DCI format 0 is control information that is used in the dynamic scheduling of the uplink data, but is used in the activation of the uplink SPS as well. DCI format 0 includes each field of NDI, TPCcommandforscheduledPDSCH, CyclicshiftRMRS, MCSandRV, ResourceBlock or the like.

The wireless base station 10 can notify the wireless terminal 20 that the uplink SPS is activated, by setting values of these fields that are included in DCI format 0 to values that are indicated by an "activation column" in a table illustrated in FIG. 10A. Here, an MCS field is a 5-bit field. The first one bit is set 0, and a modulation and coding scheme that is used in the SPS is designated by the remaining four bits. Furthermore, ResourceBlock has a size that differs according to an uplink bandwidth (for example, in a case where the uplink bandwidth is 50 MHz, the size is 6 bits, and in a case where the uplink bandwidth is 100 MHz, the size is 8 bits), but by doing this, a resource block (which results from dividing the uplink bandwidth, and thus is a unit for resources in a frequency direction) in each subframe that is transmitted in the SPS can be designated.

On the other hand, in a case where the downlink SPS is activated, any one of DCI format 1, DCI format 1A, DCI format 2, DCI format 2A, DCI format 2B, and DCI format 2C is used. The wireless base station 10 can notify the wireless terminal 20 that the downlink SPS is activated, by setting the values of these fields in DCI format 0 to a value that is indicated by an "activation" column in a table illustrated in FIG. 10B.

Next, in S403 to S409 in FIG. 7, the wireless terminal 20 performs the transmission that is based on the SPS. The SPS transmission is performed based on various parameters that are notified with the RRC signal in S401 and the DCI in S402.

Figure 11:
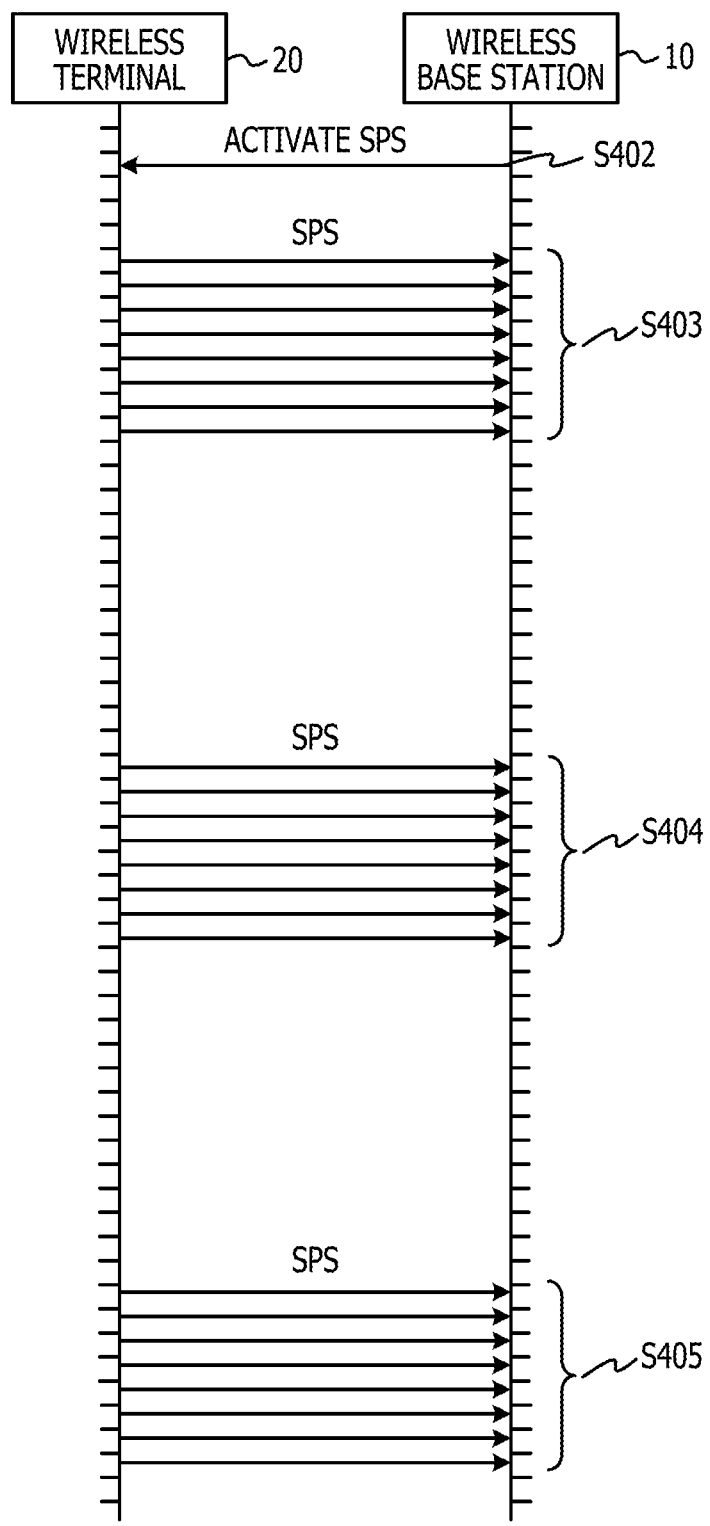
FIG. 11 is a magnified diagram that illustrates one portion of one example of a sequence of processing by the wireless communication system according to the second embodiment.

FIG. 11 is a diagram that corresponds to S402 to S405 in FIG. 7. As described referring to FIG. 2, S403 in which there is the initial transmission that is based on the SPS is performed in the fourth or later subframe after the subframe in which the DCI is transmitted and received in S402. Because timing differences (in a case of a FDD) between the 4 subframes are fixed values that are stipulated in advance in specifications, the wireless terminal 20 can recognize the timing of the initial transmission of the SPS based on the timing received in S402, without receiving an instruction and the like from the wireless base station 10.

Then, thereafter, as illustrated in S403 to S405 in FIG. 11 or S403 to S409 in FIG. 7, the wireless terminal 20 performs the transmission to the wireless base station 10, that is based on the SPS, based on values of semiPersistSchedulingIntervalUL and semiPersistSchedulingTransmissionPeriodUL that are notified by the RRC signal in S401. FIG. 11 illustrates a case where the value of semiPersistSchedulingIntervalUL that is included in the RRC signal in S401 is 20 subframes, as one example. Furthermore, FIG. 11 illustrates a case where the value of semiPersistSchedulingTransmissionPeriodUL that is included in the RRC signal in S401 is 8 subframes, as one example. At this time, as illustrated in S403 to S405 in FIG. 11, in the communication interval that is configured from 20 subframes, the wireless terminal 20 can perform the transmission to the wireless base station 10 in consecutive 8 subframes in each communication interval.

Next, processing that transmits (for example, transmits consecutive 8 subframes as illustrated in S403 in FIG. 11) the consecutive subframes in each communication interval is described in detail. Here, for brief description, the precondition is provided that data that is transmitted in each communication interval by the wireless terminal 20 is decided before the transmission in the communication interval. Then, data that is transmitted in each communication interval is set to be divided with subframes of which the number is indicated by the value of semiPersistSchedulingTransmissionPeriodUL and to be transmitted.

In S403 and the like, the wireless terminal 20 divides the data that is transmitted in the communication interval into pieces of data of which the number is indicated by the value of semiPersistSchedulingTransmissionPeriodUL, and transmits the resulting pieces of data with the consecutive subframes of which the number is indicated by semiPersistSchedulingTransmissionPeriodUL, respectively. In an example in FIG. 11, the wireless terminal 20 transmits the 8 pieces of data that result from dividing the data that is transmitted in the communication interval, with the consecutive 8 subframes, respectively, in S403 and the like. At this time, the wireless terminal 20 codes and modulates the pieces of data that result from the division based on the MCS that is designated with the DCI in S402, with the subframes of which the number is indicated by the value of semiPersistSchedulingTransmissionPeriodUL, respectively. Furthermore, the wireless terminal 20 maps the pieces of data that result from the division and that are coded and modulated, to ResourceBlock designated with the DCI in S402, with the subframes of which the number is indicated by the value of semiPersistSchedulingTransmissionPeriodUL, respectively. As described above, the wireless terminal 20 can perform the transmission that is based on the SPS corresponding to S403 and the like.

Incidentally, retransmission is performed in an LTE system. For this reason, when receiving the data, the wireless base station 10 transmits to the wireless terminal 20 an ACK signal or a NACK signal that is a response signal. The ACK signal is a response signal indicating that the reception (decoding) of data has succeeded. On the other hand, a NACK signal is a response signal indicating that the reception (decoding) of data has failed. The wireless terminal 20 determines whether or not the retransmission of the data is performed, based on these response signals. In the LTE system, it is stipulated that the ACK signal or the NACK signal is transmitted in the fourth or later subframe from the subframe with which the data is received.

The ACK signal and the NACK signal in response to each piece of data are not illustrated in FIGS. 7 and 11, but the wireless base station 10 according to the present embodiment is set to transmit the ACK signal or the NACK signal to the wireless terminal 20 according to a result of the reception. Several schemes are considered in the transmission of the ACK signal or the NACK signal. The simplest scheme is one in which the ACK signal or the NACK signal can be transmitted with every subframe in compliance with a general LTE system (for convenience, this is called an individual response scheme). With the individual response scheme, the retransmission can be performed with every subframe as well. With the individual response scheme, as is illustrated in FIG. 11, the wireless base station 10 has to transmit the ACK signal or the NACK signal to the wireless terminal 20 with each of 8 subframes that are transmitted in the SPS in each communication interval. To be more precise, in an example in FIG. 11, there has to be 8 ACK signals or 8 NACK signals in each communication interval of the SPS transmission.

The individual response scheme in which the ACK signal or the NACK signal is transmitted with every subframe in this manner may be easily adapted to an existing LTE system, but there is a concern that an amount of signaling will become enormous. Thus, a scheme in which one ACK signal or one NACK signal is transmitted in every communication interval is considered (for convenience, this is called a batch response scheme). Based on the example in FIG. 11, the wireless base station 10 is described as transmitting an ACK only once in a case where the wireless base station 10 succeeds in receiving all the subframes of which the transmission is possible in the communication interval after all the subframe of which the transmission is possible in the communication interval up to the last (8-th) subframe of which the transmission is possible in each communication interval are received. On the other hand, the wireless base station 10 transmits a NACK only once even if the wireless base station 10 fails to receive even one subframe of which the transmission is possible in the communication interval. However, in the batch response scheme, in a case where the retransmission is desired, 8 subframes have to be retransmitted collectively. For this reason, an amount of signaling is smaller, but there occurs another problem in that an amount of data to be retransmitted is greater.

Thus, a retransmission scheme that results from combining the individual response scheme and the batch response scheme is considered. For example, in a case where the wireless base station 10 succeeds in receiving all the subframes of which the transmission is possible in a certain communication interval, the wireless base station 10 transmits the ACK only one time in the end. On the other hand, in a case where the wireless base station 10 fails to receive any one of the subframes of which the transmission is possible in the communication interval, the wireless base station 10 can transmit the ACK signal or the NACK signal with every subframe after the subframe that is not received. When this is done, an amount of signaling can be reduced, and it is possible to perform the retransmission with every subframe.

Alternatively, the ACK signal or the NACK signal may be a one-bit signal, but increasing one bit to a plurality of bits can be considered. For example, the ACK signal or the NACK signal can be set to be an 8 bit bitmap, and can be mapped to results of receiving each of 8 subframes of which the transmission is possible in each communication interval in FIG. 2. With this method, it is also possible to perform the retransmission with every subframe while reducing an amount of signaling.

Moreover, in a case where the retransmission is performed, the wireless terminal 20 can perform the retransmission using the radio resources that are allocated from the wireless base station 10 based on the timing scheduling. Furthermore, the retransmission can also be performed using the radio resources in the next communication interval.

Lastly, according to the second embodiment described above, as one example, a case is described where a precondition is provided in which it is possible to transmit only the consecutive subframes in each communication interval of the SPS transmission. However, the precondition described above is not indispensable according to the second embodiment (including other embodiments that are based on the second embodiments, which are described below). That is, according to the second embodiment, it is possible to transmit non-consecutive subframes in each communication interval of the SPS transmission.

Specifically, a parameter for the SPS transmission, parameter semiPersistSchedulingTransmissionPeriodUL, is described above as indicating the number of consecutive subframes of which the transmission is possible in each communication interval of the uplink SPS, but is not limited to this. As one example, semiPersistSchedulingTransmissionPeriodUL can be set to be a bitmap that is made from the number of bits corresponding to the communication interval (units of subframes) of the SPS transmission. At this time, in semiPersistSchedulingTransmissionPeriodUL, each bit in the bitmap indicates whether or not the radio resources are allocated in one of the subframes of which the transmission is possible in each communication interval. Furthermore, with semiPersistSchedulingTransmissionPeriodUL as the bitmap that is made from the predetermined number of bits, each bit in the bitmap may be set to indicate whether or not the radio resources are allocated in one of the subframes, each consisting of a predetermined number of bits, from the front in each transmission interval.

According to the second embodiment described above, various effects are obtained as is the case according to the first embodiment.

That is, with the wireless communication system according to the second embodiment, when the wireless base station 10 allocates the radio resources for the SPS, it is possible to allocate the radio resources over a plurality of subframes in each communication interval. Accordingly, it is possible to flexibly allocate the radio resources for the SPS in the time direction.

Accordingly, according to the second embodiment, in a case where the SPS is performed, if a comparatively large amount of data is transmitted in each communication interval, it is possible to transmit the comparatively large amount of data with the plurality of subframes that results from the division. For this reason, the number of radio resources that are secured in advance in the plurality of subframes is lower. As a result, in the SPS, in most cases, the radio resources in a certain subframe are not in short supply, and the problems described above can be solved.

Additionally, the second embodiment can be realized without increasing an amount of signaling, compared with the SPS in the related art, which is illustrated in FIG. 1 and the like. Furthermore, according to the second embodiment, the amount of signaling can be decreased to a greater extent than in the SPS in the related art, in terms of the dynamic scheduling. For example, while the signaling has to be performed three times when the transmission in FIG. 2 that illustrates the SPS in the related art is set to be realized with the dynamic scheduling, the signaling has to be performed 24 times when the transmission in FIG. 11 that illustrates the second embodiment is set to be realized with the dynamic scheduling. It can also be understood from this that according to the second embodiment, an effect of decreasing an amount of signaling is great.

In addition to this, according to the second embodiment, each communication interval in which data that has to be sent out is divided into a plurality of subframes and the data can be transmitted with the resulting a plurality of subframes. Accordingly, when transmission power is set to be fixed, because the transmission power per bit is relatively larger, coverage is improved. In other words, because the modulation scheme•coding scheme resilient to the error is used, an effect of improving communication characteristics can be accomplished.

Third Embodiment

A third embodiment is a modification example that is applicable to the first embodiment or the second embodiment. As an example of the third embodiment, a modification example that is based on the second embodiment is described below, but a modification example that is based on the first embodiment has the same configuration as the modification example that is based on the second embodiment.

The third embodiment is also described based on the case where the invention in the present application is applied to the uplink SPS transmission. However, it is noted that the invention in the present application can be also applied in the same manner to downlink SPS transmission. Furthermore, as illustrated according to the first embodiment, the invention in the present application is not limited to the SPS in LTE, and it goes without saying that the invention is generally applicable in the communication over the communication interval.

Figure 12:
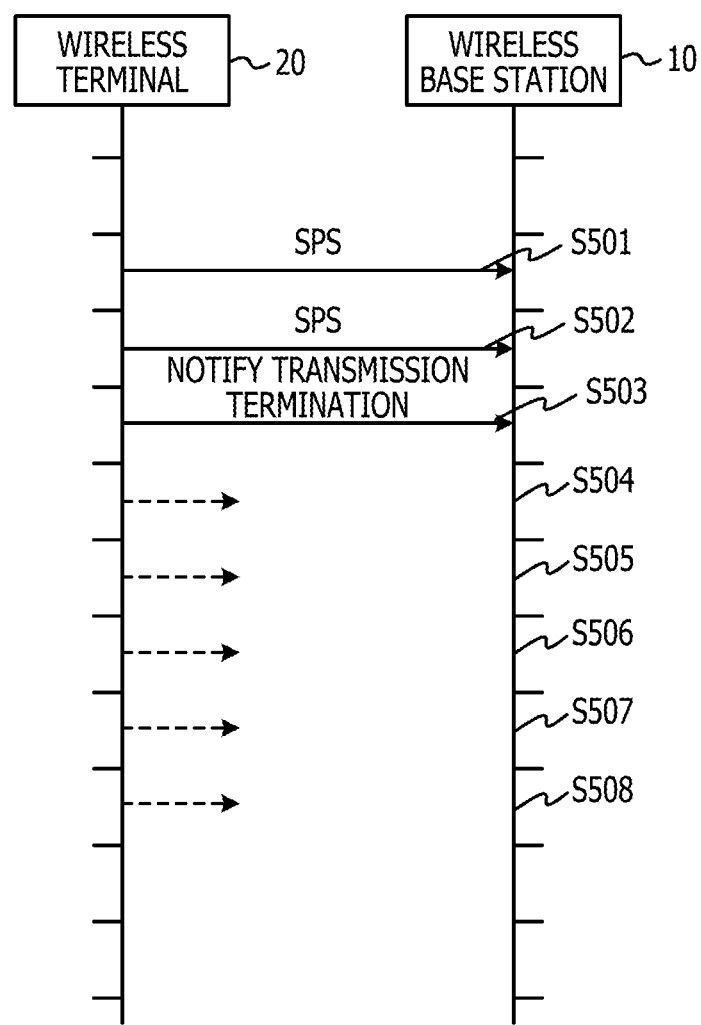
FIG. 12 is a diagram illustrating one example (in which unoccupied resources are not available for allocation in a case of the uplink) of a sequence of processing by a wireless communication system according to a third embodiment.

FIG. 12 illustrates one example of a sequence of processing by a wireless communication system according to the third embodiment. FIG. 12 corresponds to the individual SPS transmission (for example, the one in S403 and the like in FIG. 11) in the SPS according to the second embodiment. As one example, the SPS transmission is illustrated in FIG. 12 on the precondition that according to the second embodiment, the value of semiPersistSchedulingTransmissionPeriodUL is 8 subframes. In other words, S501 to S508 in FIG. 12 correspond to consecutive 8 subframes of which the transmission is performed in S403 in FIG. 11 and the like. Moreover, here, the 8 subframes are only one example, and it goes without going that the present embodiment is applicable to any number of subframes as well.

Preconditions for the wireless communication system according to the third embodiment will be described. According to the second embodiment, the data that is transmitted in each communication interval of the SPS is divided and is transmitted with all the consecutive subframes of which the number is indicated by the value of semiPersistSchedulingTransmissionPeriodUL. In contrast, according to the third embodiment, the data that is transmitted in each communication interval of the SPS does not have to be divided and transmitted with all the consecutive subframes of which the number is indicated by the value of semiPersistSchedulingTransmissionPeriodUL. According to the third embodiment, the data that is transmitted in each communication interval of the SPS can be divided and be transmitted with an arbitrary number of subframes from the front among the consecutive subframes of which the transmission is possible in each communication interval, and of which the number is indicated by the value of semiPersistSchedulingTransmissionPeriodUL.

For example, it is considered that in some cases, an amount of data that is transmitted happens to be small in the SPS. In such a case, a small amount of data seldom has to be transmitted with many of the subframes that result from the division. Because the transmission of the small amount of data with the minimum number of frames that result from the division can suppress an increase in power consumption due to an increase in the number of times that the transmission is performed, it is considered that desirable cases are also present. According to the present embodiment, for this reason, as described above, the data that is transmitted in each communication interval of the SPS does not have to be divided and transmitted with all the consecutive subframes of which the transmission is possible in each communication interval.

The wireless terminal 20 in S501 and S502 in FIG. 12 performs SPS transmission with 2 subframes from the front among the subframes of which the transmission is possible in a certain communication interval. Here, the 2 subframes are only one example, and it goes without saying that subframes of which the number is a number subframes other than two are possible.

The wireless terminal 20 in S503 in FIG. 12 notifies the wireless base station 10 of transmission completion indicating that the SPS transmission is completed in the communication interval. Notification indicating the transmission completion (hereinafter called a transmission completion notification), for example, can be performed using the radio resources for the SPS transmission. This is because it is considered that separate allocation of the radio resources for the notification is not efficient. The transmission completion notification, for example, can use the fact that a buffer size is set to 0 in the buffer status report (BSR) indicating an amount of uplink data. Because the BSR is information that is transmitted over the PUSCH, it is possible to perform the transmission completion notification that uses the BSR, using the radio resources for the SPS transmission. The transmission completion notification that uses the BSR may be set to be transmitted with a subframe that immediately follows a subframe with which data is finally transmitted, and can be transmitted in a state of being stored in an unoccupied portion of the subframe with which the data is finally transmitted.

The wireless terminal 20 in S504 to S508 in FIG. 12 does not perform the SPS transmission. In S504 to S508, the wireless base station 10 does not perform processing that receives the SPS, either. By the transmission completion notification in S503, the wireless base station 10 can recognize in advance that the wireless terminal 20 does not perform the transmission with the subframe in S504 to S508.

Moreover, in a case where the BSR is used as the transmission completion notification in S503, SPS is temporarily released. Therefore, the wireless terminal 20 performs neither the transmission in S504 to S508, nor performs the SPS transmission even with the communication intervals that follow the communication interval corresponding to S501 to S508. In this case, it is possible for the wireless base station 10 to cause the wireless terminal 20 to resume the SPS transmission by activating the SPS again for the wireless terminal 20.

According to the third embodiment that is illustrated in FIG. 12, the number of times that the wireless terminal 20 performs the transmission can be decreased, as desired in each communication interval for the SPS transmission, and the power consumption by the wireless terminal 20 can be reduced.

Moreover, the BSR is described above as being used as the transmission completion notification in S503, but in S503, the different wireless terminal 20 can notify the wireless base station 10 of the transmission completion using other schemes. As one example, the wireless terminal 20 can notify the wireless base station 10 of the transmission completion by not performing the transmission with the subframe in S503. Furthermore, the wireless terminal 20 may be set to notify the wireless base station 10 of the transmission completion by not performing the transmission with a predetermined number of subframes including S503. The predetermined number of subframes in such a case can be set to be the number of subframes that is indicated by implicitReleaseAfter which is a parameter that is included in SPS-ConfigUL which is illustrated in FIG. 9. Moreover, that the wireless terminal 200 does not perform the transmission with the subframes of which the number is indicated by a value of implicitReleaseAfter indicates that the wireless terminal 20 explicitly releases the SPS transmission. For this reason, in this case, the SPS is temporarily released. It is possible for the wireless base station 10 to cause the wireless terminal 20 to resume the SPS transmission by activating the SPS again for the wireless terminal 20.

Furthermore, as the transmission completion notification in S503, a new signal for notifying the transmission completion may be defined and used. The new signal, for example, may be set to be transmitted over the PUCCH, and may be set to be transmitted over the PUSCH. In a case where the transmission is performed over the PUSCH, for example, the transmission can be performed using the radio resources for the SPS transmission. This is because it is considered that separate allocation of the radio resources for the notification is not efficient.

Additionally, in a case where the new signal is used as the transmission completion notification in S503, the SPS may not be released. In this case, the wireless terminal 20 does not perform the transmission in S504 to S508, but performs the SPS transmission in the communication intervals that follow the communication interval corresponding to S501 to S508. In other words, because the SPS transmission is not temporarily released, it is possible for the wireless terminal 20 to continue the SPS transmission without the wireless base station 10 activating the SPS again for the wireless terminal 20.

Next, a modification example that results from making an amendment to the third embodiment is described. According to the third embodiment that is illustrated in FIG. 12, in S504 to S508, the wireless terminal 20 does not perform the transmission, the radio resources for performing the transmission at this time are already allocated by the advance RRC signal and DCI. That is, in S504 to S508 in FIG. 12, the wireless terminal 20 does not perform the transmission, and thus, the already-allocated radio resources are wasted. This is not preferable in terms of the efficient use of the radio resources. Thus, in a modification example of the third embodiment, which is described below, the wireless base station 10 can allocate the radio resources with which the wireless terminal 20 does not perform the transmission to a different wireless terminal. Accordingly, waste of the radio resources can be suppressed, and it is considered that it is possible to have an efficient use of the radio resources while suppressing an amount of signaling.

Figure 13:
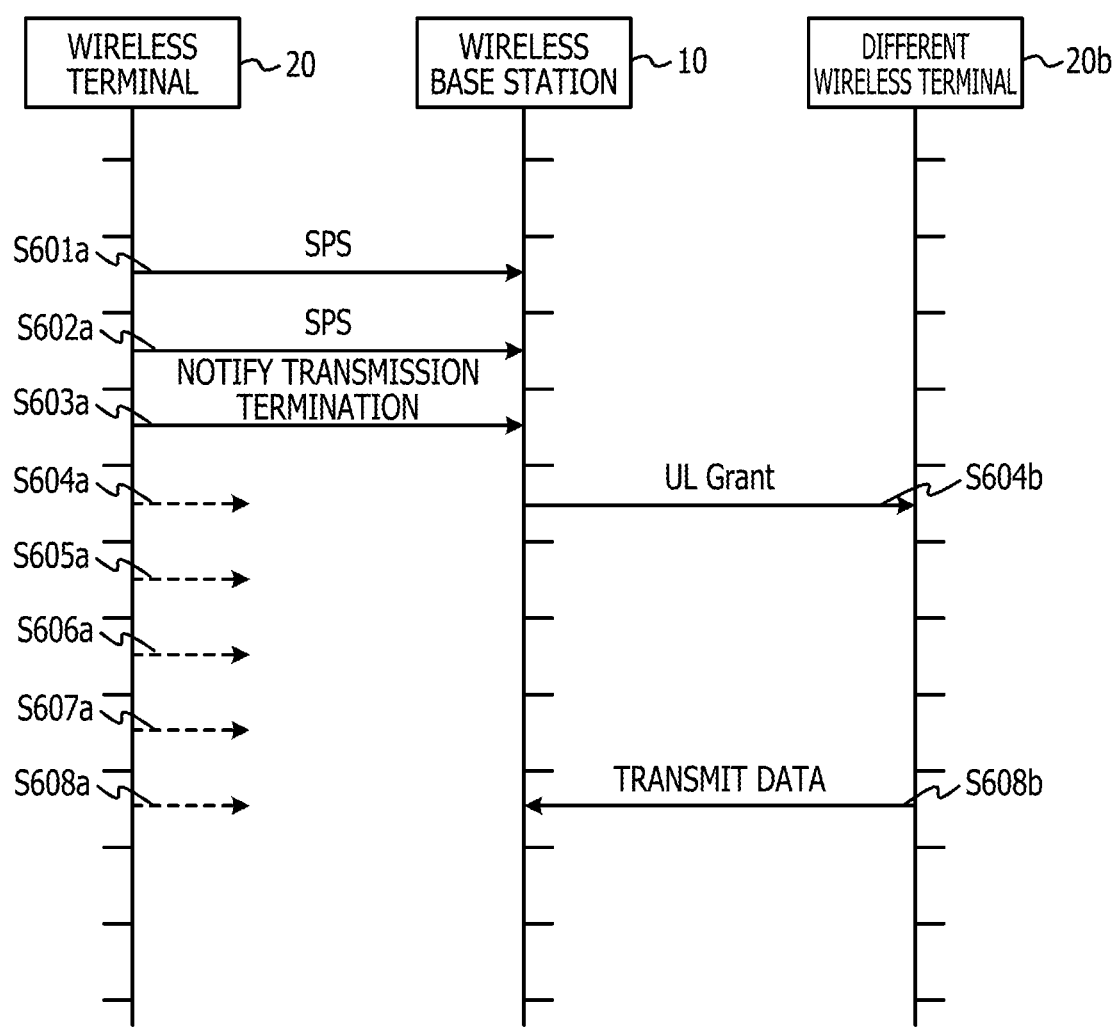
FIG. 13 is a diagram illustrating one example (in which unoccupied resources are available for allocation in a case of the uplink) of a sequence of processing by the wireless communication system according to the third embodiment.
Figure 14:
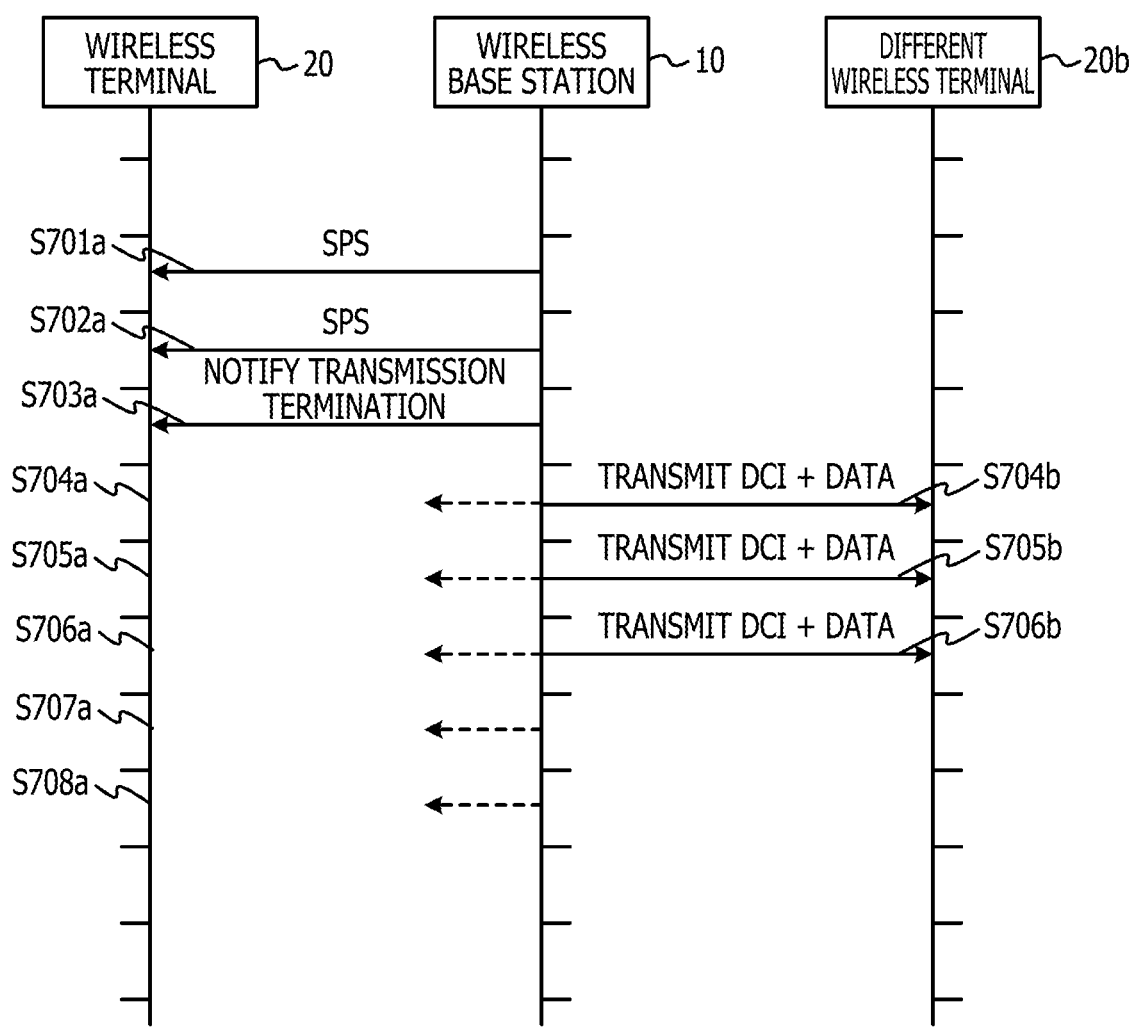
FIG. 14 is a diagram illustrating one example (in which unoccupied resources are available for allocation in a case of the downlink) of a sequence of processing by the wireless communication system according to the third embodiment.

FIG. 13 illustrates one example of a sequence of processing by a wireless communication system according to the modification example of the third embodiment. In FIG. 13 and FIG. 14 that is referred to, because two wireless terminals 20 appear, for convenience, one is referred to as a wireless terminal 20a and the other is referred to as a different wireless terminal 20b.

In FIG. 13 and in descriptions provided below, in a case where an English letter is added to a number given to each processing in the drawings, this is set to indicate that processing having the same number is performed at a timing of the same subframe. For example, S604a and S604b are performed at the timing of the same subframe.

Processing tasks in S601a to S603a in FIG. 13 are the same as those in S501 to S503 in FIG. 12, respectively, and description thereof is omitted.

The wireless terminal 20a in S604a to S608a in FIG. 13 does not perform the transmission in the same manner as in S504 to S508 in FIG. 12. On the other hand, in S604b, the wireless base station 10 transmits the UL grant to the different wireless terminal 20b that is different from the wireless terminal 20a. With the UL grant, the wireless base station 10 designates the radio resources for the uplink transmission, which are allocated to the different wireless terminal 20b, but it is possible to use what is released with the radio resources for the SPS transmission by the wireless terminal 20a in all or some of the radio resources. Moreover, according to specifications, it is stipulated that the radio resources that are designated with the UL grant are radio resources on a fourth or later subframe after a subframe with which the UL grant is transmitted. For this reason, only in a case where the released radio resources are radio resource on the fourth or later subframe after the subframe with which the UL grant is transmitted, the wireless base station 10 can perform the allocation of the release-completed resources to the different wireless terminal 20b using the UL grant.

In S608b in FIG. 13, the different wireless terminal 20b transmits uplink data to the wireless base station 10 based on the UL grant in S604b. As described above, S608b corresponds to the fourth or later subframe in S604b after the subframe with which the UL grant is transmitted. Accordingly, because it is possible to allocate the radio resources for the uplink transmission, which are released by the wireless terminal 20a, to the different wireless terminal 20b, it is possible to have an efficient use of the radio resources for the uplink.

Moreover, the released radio resources for the uplink resources can be used repeatedly in downlink communication to the different wireless terminal 20b. When the wireless terminal 20a transmits a release with a certain subframe, the wireless base station 10 can detect the release request with the subframe. Then, the released radio resources can be used in the resources for the downlink to the different wireless terminal 20b. Specifically, in the subframe that immediately follows, the radio resources with which the PDSCH is transmitted is designated by the PDCCH.

Incidentally, FIG. 13 is a modification example of the third embodiment that is based on the uplink SPS. In contrast, FIG. 14 illustrates one example of a sequence of processing by a wireless communication system according to the modification example of the third embodiment that is based on the downlink SPS. In S701a to S702a, the wireless base station 10 performs the downlink SPS transmission, and in S703a, the wireless base station 10 notifies the wireless terminal 20a of the transmission completion.

As described above, in a case of the uplink, there has to be a time lag that is equivalent to 4 subframes between the allocation (the UL grant) of the radio resources by the wireless base station 10 and the uplink transmission corresponding to the allocation. In contrast, in a case of the downlink, the allocation (DCI) of the radio resources by the wireless base station 10 and downlink data transmission are performed with the same subframe. Therefore, as illustrated in S704b to S706b in FIG. 14, the wireless base station 10 can perform the allocation of the downlink resources and the downlink data transmission to a different wireless terminal 20b, starting from a subframe that immediately follows a subframe with which the transmission completion notification is transmitted.

According to the modification example of the third embodiment that is illustrated in FIGS. 13 and 14, in the same manner as according to the third embodiment, the number of times that the wireless terminal 20a perform the transmission can be decreased, as desired in each communication interval for the SPS transmission, and the power consumption by the wireless terminal 20a can be reduced. Additionally, according to the modification example of the third embodiment, even though the transmission is not performed with radio resources among the radio resources for the SPS transmission, it is possible to perform the allocation to the different wireless terminal 20b. Accordingly, because waste of the radio resource for the SPS transmission is suppressed, an effect of making it possible to have an efficient use of the radio resources is accomplished.

Fourth Embodiment

A fourth embodiment is a modification example that is applicable to the first embodiment to the third embodiment. As an example of the fourth embodiment, a modification example that is based on the second embodiment is described below, but a modification example that is based on the first embodiment or a modification example that is based on the third embodiment has the same configuration as the modification example that is based on the second embodiment.

The fourth embodiment is also described based on the case where the invention in the present application is applied to the uplink SPS transmission. However, it is noted that the invention in the present application can be also applied in the same manner to downlink SPS transmission. Furthermore, as illustrated according to the first embodiment, the invention in the present application is not limited to the SPS in LTE, and it goes without saying that the invention is generally applicable in the communication over the communication interval.

Figure 15:
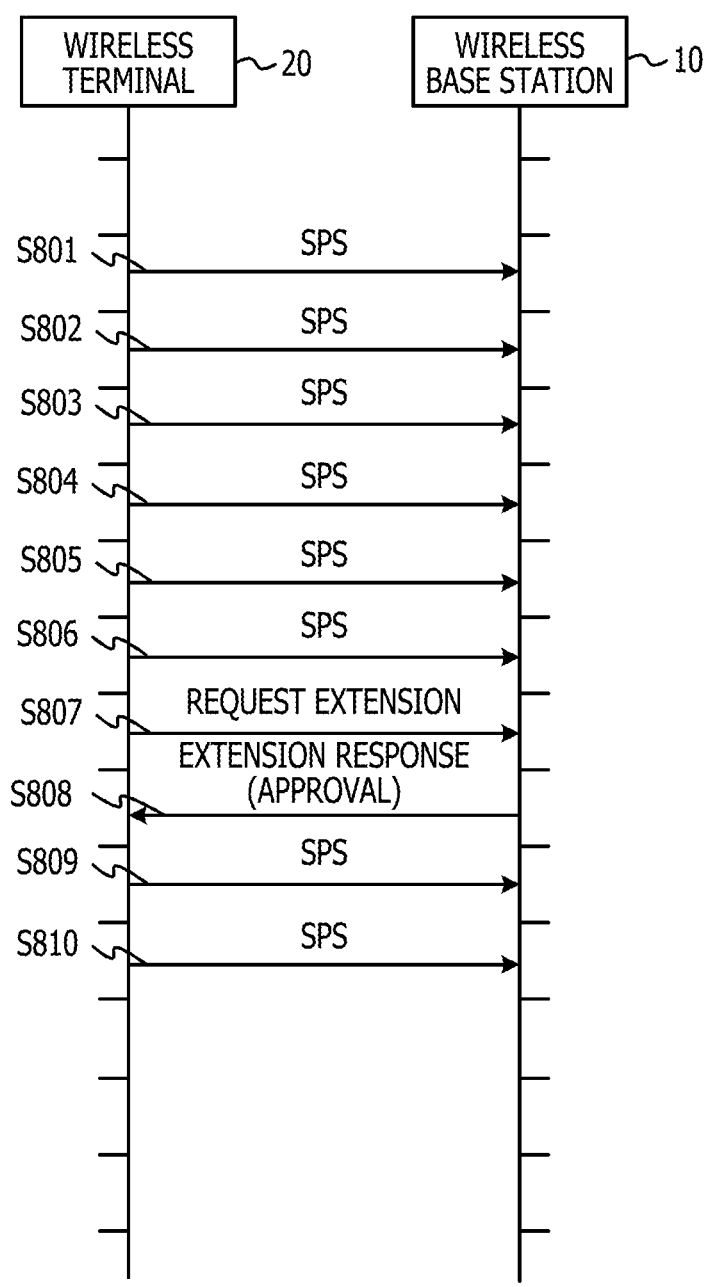
FIG. 15 is a diagram illustrating one example of a sequence of processing by a wireless communication system according to a fourth embodiment.

FIG. 15 illustrates one example of a sequence of processing by a wireless communication system according to a fourth embodiment. FIG. 15 corresponds to the individual SPS transmission (for example, the one in S403 and the like in FIG. 11) in the SPS according to the second embodiment.

FIG. 15 illustrates one example of the sequence of the processing by the wireless communication system according to the fourth embodiment. FIG. 15 corresponds to the individual SPS transmission (for example, the one in S403 and the like in FIG. 11) in the SPS according to the fourth embodiment. As one example, the SPS transmission is illustrated in FIG. 15 on the precondition that the value of semiPersistSchedulingTransmissionPeriodUL according to the second embodiment is 8 subframes. In other words, S801 to S808 in FIG. 15 correspond to consecutive 8 subframes of which the transmission is performed in S403 in FIG. 11 and the like. Moreover, here, the 8 subframes are only one example, and it goes without saying that the present embodiment is applicable to any number of subframes as well.

The wireless terminal 20 in S801 to S806 in FIG. 15 performs the SPS transmission with 6 subframes from the front among consecutive 8 subframes of which the transmission is possible in a certain communication interval. Here, the 6 subframes are only one example, and it goes without saying that any number of subframes is possible.

The wireless terminal 20 in S807 in FIG. 15 transmits to the wireless base station 10 an extension request to the effect that the SPS transmission has to be extended. The extension request, for example, can be made by a scheduling request (SR) that is a control signal which is used in dynamic scheduling in the related art. In this case, according to a policy for a system, a precondition is desirable that the dynamic scheduling is not performed in a predetermined wireless terminal 20 (for example, the MTC device) to which the wireless base station 10 is transmitting the SPS. This is because, under the precondition, the MTC device that is transmitting the SPS does not have to transmit the SR for the dynamic scheduling and thus can use the SR as a control signal for the SPS extension. On the other hand, even though the precondition is provided, because it is considered that for example, irregular transmission such as Web traffic does not occur in the normal MTC device and the dynamic scheduling is unnecessary, it is considered that a harmful effect almost never occurs. Under the precondition, if the SR is used as a request for the extension of the SPS transmission, in a case where the SR is received from the MTC device that is performing the SPS, the wireless base station 10 can recognize that the SPS extension is requested, without performing the normal dynamic scheduling.

Furthermore, a signal for the extension request in S807 can be defined separately from the SR. The signal for the extension request, for example, may be transmitted over the PUCCH and may be transmitted over the PUSCH. In the case where the transmission is performed over the PUSCH, for example, the transmission can be performed using the radio resources for the SPS transmission. This is because it is considered that separate allocation of the radio resources for the notification is not efficient.

The wireless base station 10 in S808 in FIG. 15 transmits an extension response in response to the extension request in S807. As the extension response, for example, the DCI can be used that is used when the SPS is activated (reactivated). The DCI can be transmitted over the PDCCH.

Furthermore, for the extension response, a signal that is different from the DCI can be newly defined and used. In this case, the extension response can include information indicating whether or not the extension of the SPS transmission is approved. Furthermore, the extension response may designate a period to which the SPS is extended (for example, the number of subframes). The extension response, for example, may be transmitted over the PDCCH, and may be transmitted over the PDSCH.

Moreover, although not illustrated in FIG. 15, the wireless terminal 20 may transmit uplink data with the same subframe as in S808. Because the subframe in S808 corresponds to the SPS transmission before the extension, it is noted that it is possible for the wireless terminal 20 to perform the transmission in S808 regardless of whether the extension of the SPS transmission is approved by the wireless base station 10.

Then, in S809 and S810 in FIG. 15, the wireless terminal 20 performs the extended SPS transmission. The extension period of the SPS transmission may be determined, and may not be particularly determined. With the extension request, for example, as described above, the wireless base station 10 may designate the extension period of the SPS transmission for the wireless terminal 20. The extension period of the SPS transmission may be notified with an arbitrary downlink signal. Moreover, in FIG. 15, the extended SPS transmission is performed with 2 subframes, but it goes without saying that 2 subframes is only an example.

Moreover, in FIG. 15, the extension response in S808 may be omitted. This is because one aspect of the extension response is a response signal in response to the extension request, but in a case where particularly, the extension response is transmitted over the PUCCH by the SR and the like, the PUCCH has a low error rate and thus the significance of the response signal is not so great. In a case where the extension response is omitted, the wireless terminal 20 can recognize that the extension request is not approved, by the ACK being not returned in response to the extended SPS transmission.

According to the fourth embodiment described above, the SPS transmission can be extended in a certain communication interval. In other words, according to the fourth embodiment, it is possible to increase the number of subframes with which the SPS transmission is performed in a certain communication interval, as desired.

Fifth Embodiment

A fifth embodiment is a modification example that results from combining the invention in the present application with discontinuous reception. The fifth embodiment can be appropriately combined with the second to fourth embodiments.

The fifth embodiment is also described based on the case where the invention in the present application is applied to the uplink SPS transmission. However, it is noted that the invention in the present application can be also applied in the same manner to downlink SPS transmission. Furthermore, as illustrated according to the first embodiment, the invention in the present application is not limited to the SPS in LTE, and it goes without saying that the invention is generally applicable in the communication over the communication interval.

In the LTE system, a function called the discontinuous reception (DRX) has been introduced. DRX is a technology that reduces power consumption by the wireless terminal 20 that is performing the communication. Because the wireless terminal 20 that is performing the communication has to receive a control signal (PDCCH) and the like that are signals indicating data communication due to discontinuity of the data communication, it is difficult for the wireless terminal 20 that is performing the communication to completely power off a communication function. However, in terms of power consumption, it is not preferable that the wireless terminal 20 that is performing the communication at all times powers on the communication function. Thus, in DRX, the power consumption by the wireless terminal 20 that is performing the communication is reduced by setting processing that receives a control signal to be discontinuously performed, providing a segment vital to perform the reception and monitoring the control signal or the like in the segment, and setting the communication function to be powered off in a segment in which the reception is not performed.

DRX realizes the discontinuous reception, but it is possible to combine discontinuous transmission (DTX) with DRX. This is because the communication function is powered on in a reception period in DRX. Accordingly, the SPS and the DRX can be combined with each other, and the invention in the present specification and the DRX can be combined with each other based on the SPS.

Figure 16:
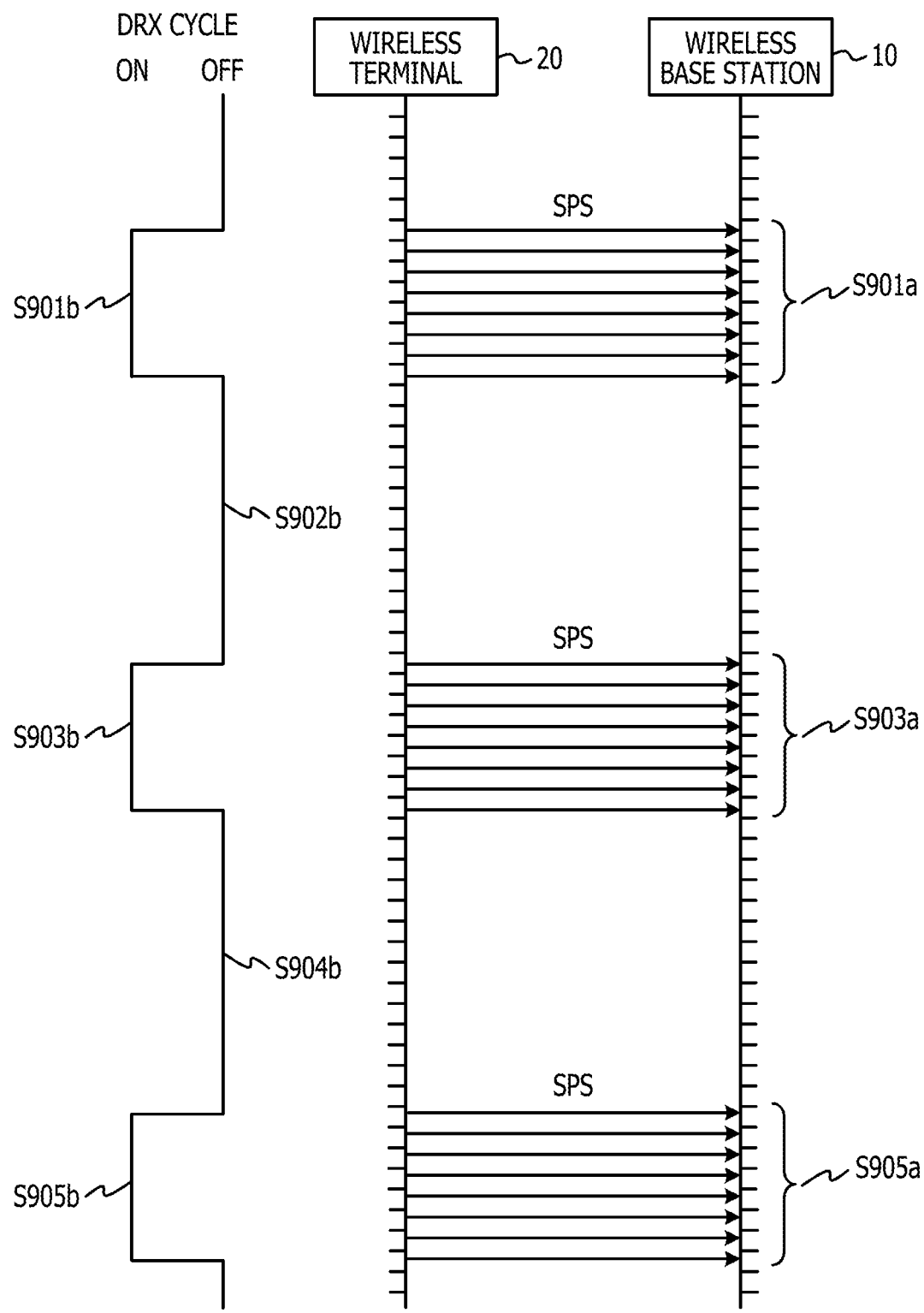
FIG. 16 is a diagram illustrating one example of a sequence of processing by a wireless communication system according to a fifth embodiment.

FIG. 16 illustrates one example of the sequence of the processing by the wireless communication system according to the fifth embodiment that results from combining the second embodiment of the invention in the present application and DRX. As illustrated in FIG. 16, the wireless terminal 20 that is performing the DRX performs reception (activity) and suspension based on a reception period and a suspension period that alternate with a period called a DRX cycle. In FIG. 16, for convenience, the reception period is indicated by ON, and the suspension period is indicated by OFF. Specifically, each of S901b, S903b, and S905b in FIG. 16 corresponds to the reception period, and each of S902b and S904b corresponds to the suspension period. Here, because the reception period of the DRX is called an active time in LTE specifications, this term is hereinafter used.

In an example in FIG. 16, the reception period of the SPS according to the invention in the present application and the active time of the DRX are consistent with each other. Specifically, S901a and S901b, S903a and S903b, and S905a and S905b in FIG. 16 are consistent with one another in terms of timing. In other words, it is also said that the DRX and the SPS are in conjunction with each other. Here, as one example, the SPS transmission is illustrated in FIG. 16 on the precondition that the value of semiPersistSchedulingTransmissionPeriodUL, which is the parameter for the SPS transmission, is 8 subframes. Setting of the active time of the DRX is performed by the wireless base station 10 transmitting the RRC signal to the wireless terminal 20. Because the setting of any of the DRX and the SPS is variously determined by the wireless base station 10, the wireless base station 10, as illustrated in FIG. 16, can link the DRX and the SPS in the wireless terminal 20.

Moreover, FIG. 16 is one example in which the invention in the present application and the DRX are combined with each other based on the SPS, and the active time of the DRX and the transmission period of the SPS according to the invention in the present application may not be necessarily consistent with each other. However, the transmission period of the SPS has to be included in the active time of the DRX. This is because the communication function of the wireless terminal 20 is powered off in a period other than the active time of the DRX, and thus the SPS transmission is impossible to perform.

Figure 17:
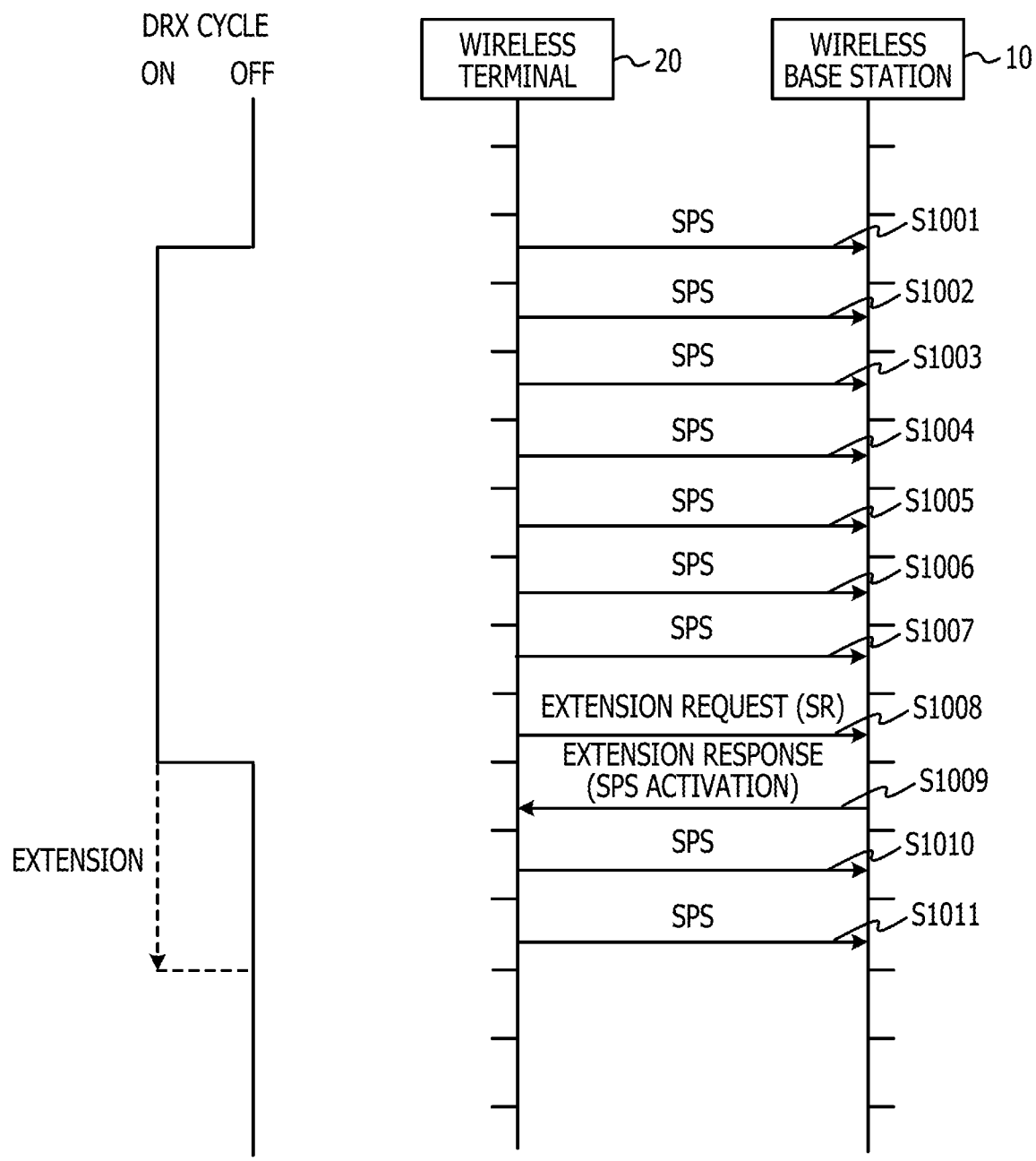
FIG. 17 is a diagram illustrating another example of a sequence of processing by the wireless communication system according to the fifth embodiment.

Here, in a case where the invention in the present application and the DRX are combined with each other based on the SPS, it is considered that, in the same manner as according to the fourth embodiment, the SPS transmission period may be extended. FIG. 17 illustrates one example of a sequence of processing by the wireless communication system, which relates to the extension of the SPS transmission period according to the fifth embodiment that results from combining the second embodiment of the invention in the present application and the DRX. FIG. 17 is a magnified diagram that illustrates the SPS transmission and the DRX reception (for example, S801a and S801b in FIG. 16) corresponding to one communication interval. Furthermore, as one example, FIG. 17 is the magnified diagram that is based on the precondition that the value of semi PersistSchedulingTransmissionPeriodUL, which is the parameter for the SPS transmission, is 8 subframes.

The wireless terminal 20 in S1001 to S1007 in FIG. 17 performs the uplink data communication that is based on the SPS. Then, the wireless terminal 20 in S1008 in FIG. 17 transmits to the wireless base station 10 the request for the extension of the SPS transmission in the same manner as in S807 in FIG. 15. However, the extension request in S1008 is set to use the SR. In the extension request in S807, the SR is only one example, but in S1008, the SR has to be used.

Here, in S1008 in FIG. 17, a subframe is the last subframe of which the transmission is possible in a certain communication interval of the SPS, and is the last subframe at the active time of the DRX. For this reason, even though the request for the extension of the SPS is transmitted using the SR in S1008, because the communication function is powered off by completing the active time of the DRX in S1009, it is also thought that the wireless terminal 20 does not receive the extension response.

However, in LTE, it is stipulated that, when the wireless terminal 20 transmits the SR, the active time of the DRX is extended as illustrated in FIG. 17 (but in a case where the SR is pending). Additionally, in LTE, it is stipulated that the wireless terminal 20 monitors (receives) the PDCCH in the active time of the DRX. However, in S1009 in FIG. 17, in a case where the wireless base station 10, for example, transmits the extension response over the PDCCH using the DCI for activating (reactivating) the SPS, the wireless terminal 20 can receive the extension response. Accordingly, in S1010 and S1011, the wireless terminal 20 can perform the extended SPS transmission at the extended active time of the DRX.

According to the fifth embodiment described above, in a case where the invention in the present application and the DRX are combined with each other, by extending the active time of the DRX, it is possible to extend the SPS transmission period without separate signaling.

[Configuration of a Network of a Wireless Communication System According to Each Embodiment]

Figure 18:
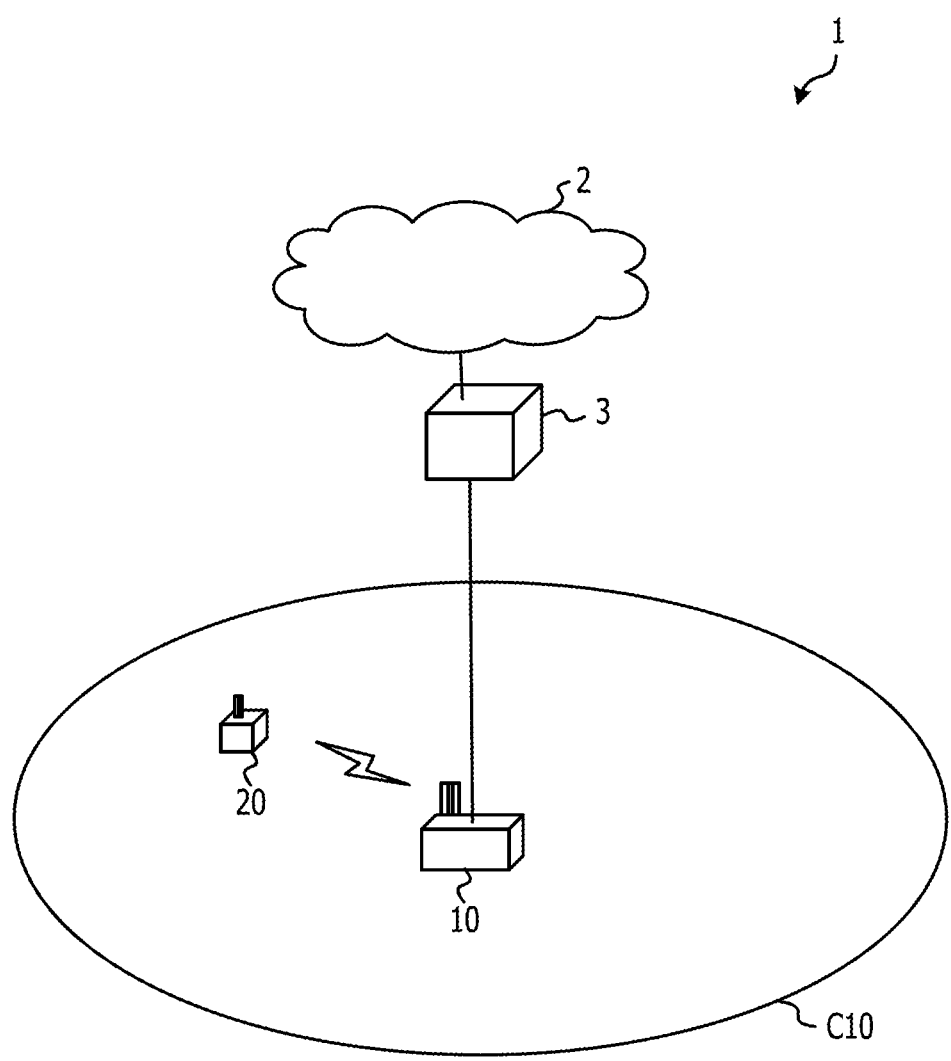
FIG. 18 is a diagram illustrating a configuration of the wireless communication system according to each embodiment.

Next, referring to FIG. 18, a network configuration of a wireless communication system 1 according to the first embodiment is described. As illustrated in FIG. 18, the wireless communication system 1 includes the wireless base station 10 and the wireless terminal 20. The wireless base station 10 forms a cell C10. The wireless terminal 20 is present in the cell C10. Moreover, it is noted that in the present application, the wireless base station 10 is referred to as a "transmission station," and the wireless terminal 20 is referred to as a "reception station."

The wireless base station 10 is connected to a network device 3 through a wired connection, and the network device 3 is connected to a network 2 through a wired connection. The wireless base station 10 is provided in such a manner as to transmit and receive data or control information to and from a different wireless base station through the network device 3 and the network 2.

The wireless base station 10 may include separate devices. One has a function of performing wireless communication with the wireless terminal 20, and the other performs digital signal processing and has a control function. In this case, the device equipped with the wireless communication function is referred to as a remote radio head (RRH), and the device equipped with the digital signal processing and the control function is referred to as a base band unit (BBU). The RRH may be installed in a state of protruding from the BBU, and an optical fiber and the like may provide a connection between the RRH and the BBU in a wired manner. Furthermore, the wireless base stations 10 may include not only a macro wireless base station and small-sized wireless base stations (including a micro wireless base station, a femto wireless base station, and the like), such as a pico wireless base station, but also variously-sized wireless base stations. Furthermore, in a case where a relay station is used that relays the wireless communication between the wireless base station 10 and the wireless terminal 20, the relay station (transmission to and reception from the wireless terminal 20 and control of the transmission and reception) also may be defined as being included in the wireless base station 10 in the present application.

On the other hand, the wireless terminal 20 performs communication with the wireless base station 10 using wireless communication.

The wireless terminal 20 may be a wireless terminal, such as a portable telephone, a smartphone, a personal digital assistant (PDA), a personal computer, or an apparatus or device (sensing device or the like) having a wireless communication function. Furthermore, in the case where the relay station is used that relays the wireless communication between the wireless base station 10 and the wireless terminal, the relay station (transmission to and reception from the wireless base station 10 and control of the transmission and reception) also may be defined as being included in the wireless terminal 20 in the present application.

The network device 3, for example, includes a communication unit and a control unit. These constituent elements are connected to one another in such a manner that it is possible to input and output a signal or data in a one-way direction or in a two-way direction. The network device 3, for example, is realized by a gateway. As a hardware configuration of the network device 3, for example, the communication unit is realized as an interface circuit, and the control unit is realized as a processor and a memory.

Moreover, specific aspects of distribution or integration of constituent elements of the wireless base station and the wireless terminal are not limited to aspects of the first embodiment. A configuration can be provided in which all or some of the constituent elements are distributed or integrated functionally or physically in arbitrary units according to various loads, operating conditions, or the like. For example, a connection to the memory as an external device of the wireless base station and the wireless terminal may be established through a network or a cable.

[Functional Configuration of Each Device in the Wireless Communication System According to Each Embodiment]

Figure 19:
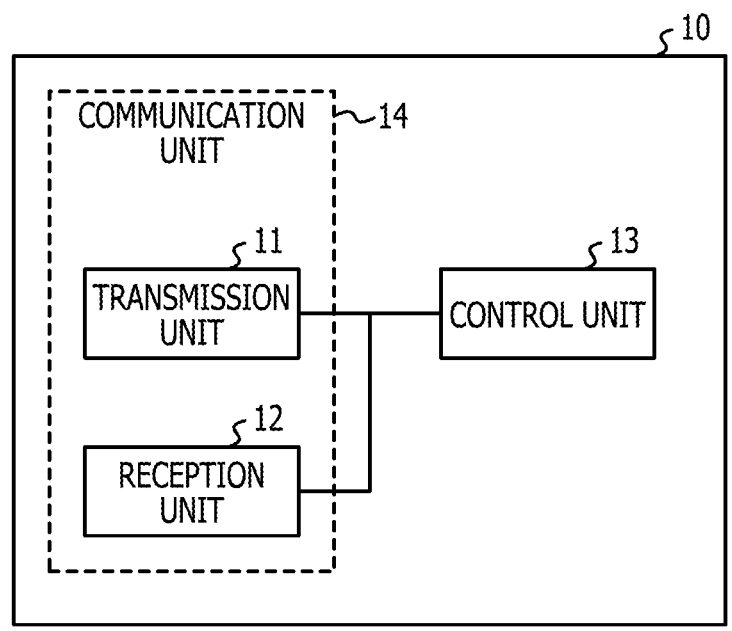
FIG. 19 is a functional block diagram illustrating a configuration of a wireless base station according to each embodiment.
Figure 20:
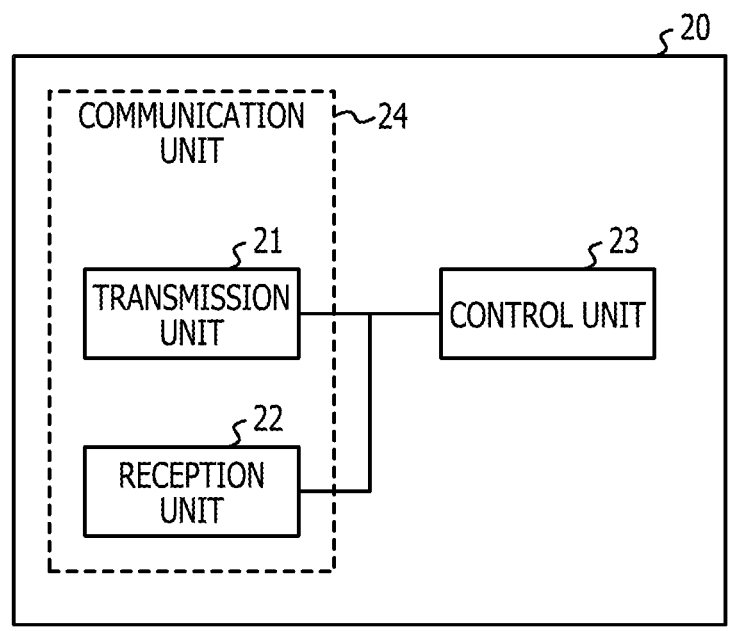
FIG. 20 is a functional block diagram illustrating a configuration of a wireless terminal according to each embodiment.

Next, referring to FIGS. 19 and 20, a functional configuration of each device in the wireless communication system according to each embodiment is described.

FIG. 19 is a functional block diagram illustrating a configuration of the wireless base station 10. As illustrated in FIG. 19, the wireless base station 10 includes a transmission unit 11, a reception unit 12, and a control unit 13. These constituent components are connected to one another in such a manner that it is possible to input and output a signal or data in a one-way direction or in a two-way direction. Moreover, the transmission unit 11 and the reception unit 12 are collectively referred to as a communication unit 14.

The transmission unit 11 transmits a data signal or a control signal through an antenna using wireless communication. Moreover, the antenna may be in common use for transmission and reception. The transmission unit 11, for example, transmits a downlink signal through a downlink data channel or a control channel. Downlink physical data channels include a specific data channel, which is a Physical Downlink Shared Channel (PDSCH). Furthermore, downlink physical control channels include a specific control channel, which is a Physical Downlink Control Channel (PDCCH). Signals that are transmitted, for example, include an L1/L2 control signal that is transferred to the wireless terminal 20 in a connected state on an individual control channel, a user data signal that is transferred to the wireless terminal 20 in the connected state on an individual data channel, or a radio resource control (RRC) control signal. Furthermore, the signals that are transmitted, for example, include a reference signal that is used for channel estimation or demodulation.

As a specific example of the signal that is transmitted by the transmission unit 11, each signal that is transmitted by each wireless base station 10 in FIGS. 1 to 7 or in FIGS. 11 to 17 may be given. Specifically, the transmission unit 11 can transmit to the wireless terminal 20 an SPS parameter notification in FIGS. 1, 3 and 7 using RRC signaling over the PDSCH. The transmission unit 11 can transmit SPS activation and SPS release in FIGS. 1 to 4, 7, and 11 to the wireless terminal 20 over the PDCCH. The transmission unit 11 can transmit the transmission that is based on the downlink SPS in FIGS. 3, 4 and 14, to the wireless terminal 20 over the PDSCH. The transmission unit 11 can transmit a transmission parameter notification in FIG. 5 to the wireless terminal 20. The transmission unit 11 can transmit the UL grant in FIG. 13 to the wireless terminal 20 (which corresponds to the different wireless terminal 20b in FIG. 13) through the PDCCH. The transmission unit 11 can transmit the transmission completion notification in FIG. 14 to the wireless terminal 20, for example, over the PDCCH or the PDSCH. The transmission unit 11 can transmit the DCI in FIG. 14 to the wireless terminal 20 (which corresponds to the different wireless terminal 20b in FIG. 13) over the PDCCH. The transmission unit 11 can transmit the downlink data transmission in FIG. 14 to the wireless terminal 20 (which corresponds to the different wireless terminal 20b in FIG. 13) over the PDSCH. The transmission unit 11 can transmit the extension response in FIGS. 15 and 17 to the wireless terminal 20, for example, over the PDCCH.

The reception unit 12 receives the data signal or the control signal that is transmitted from the wireless terminal 20 using first wireless communication through the antenna. The reception unit 12 receives an uplink signal, for example, through the uplink data channel or the control channel. The uplink physical data channels, for example, include a specific data channel, which is a Physical Uplink Shared Channel (PUSCH). Furthermore, the uplink physical control channels, for example, include a specific control channel, which is a Physical Uplink Control Channel (PUCCH). Signals that are received, for example, include the L1/L2 control signal that is transferred from the wireless terminal 20 in the connected state on a specific control channel, the user data signal that is transferred from the wireless terminal 20 in the connected state on the individual data channel, or the radio resource control (RRC) control signal. Furthermore, the signals that are received, for example, include the reference signal that is used for the channel estimation or the demodulation.

As a specific example of the signal that is transmitted by the reception unit 12, each signal that is received by each wireless base station 10 in FIGS. 1 to 7, or in FIGS. 11 to 17 may be given. Specifically, the reception unit 12 can receive the transmission that is based on the uplink SPS in FIGS. 1, 2, 7, 11 to 13, and 15 to 17, from the wireless terminal 20 over the PUSCH. The reception unit 12 can receive the uplink transmission in FIGS. 5 and 6 from the wireless terminal 20. The reception unit 12 can receive the transmission completion notification in FIGS. 12 and 13, for example, from the wireless terminal 20 over the PUSCH. The reception unit 12 can receive the uplink data transmission in FIG. 13, for example, from the wireless terminal 20 (which corresponds to the different wireless terminal 20b in FIG. 13) over the PUSCH. The reception unit 12 can receive the extension request in FIGS. 15 and 17, for example, from the wireless terminal 20 over the PUCCH.

The control unit 13 outputs data or control information that is transmitted, to the transmission unit 11. The control unit 13 inputs the data or the control information that is received, into the reception unit 12. The control unit 13 acquires the data or the control information from the network device 3 or the wireless base station through a wired connection or a wireless connection. In addition to these, the control unit performs various control tasks relating to various transmitted signals that are transmitted by the transmission unit 11, or various received signals that are received by the reception unit 12.

As a specific example of processing that is controlled by the control unit 13, various processing tasks that are performed in each wireless base station 10 in FIGS. 1 to 7 and 11 to 17 may be given. Specifically, the control unit 13 can control processing that transmits the SPS parameter notification in FIGS. 1, 3, and 7. The control unit 13 can control processing that transmits the SPS activation and the SPS release in FIGS. 1 to 4, 7, and 11. The control unit 13 can control transmission processing that is based on the downlink SPS in FIGS. 3, 4, and 14. The control unit 13 can control processing that transmits the transmission parameter notification in FIG. 5. The control unit 13 can control processing that transmits the UL grant in FIG. 13. The control unit 13 can control processing that transmits the transmission completion notification in FIG. 14. The control unit 13 can control processing that transmits the DCI in FIG. 14. The control unit 13 can control processing that transmits the downlink data transmission in FIG. 14. The control unit 13 can control processing that transmits the extension response in FIGS. 15 and 17. The control unit 13 can control reception processing that is based on the uplink SPS in FIGS. 1, 2, 7, 11 to 13, and 15 to 17. The control unit 13 can control processing that receives the uplink transmission in FIGS. 5 and 6. The control unit 13 can control processing that receives the transmission completion notification in FIGS. 12 and 13. The control unit 13 can control processing that receives the uplink data transmission in FIG. 13. The control unit 13 can control processing that receives the extension request in FIGS. 15 and 17.

FIG. 20 is a functional block diagram illustrating a configuration of the wireless terminal 20. As illustrated in FIG. 20, the wireless terminal 20 includes a transmission unit 21, a reception unit 22, and a control unit 23. These constituent components are connected to one another in such a manner that it is possible to input and output a signal or data in a one-way direction or in a two-way direction. Moreover, the transmission unit 21 and the reception unit 22 are collectively referred to as a communication unit 24.

The transmission unit 21 transmits a data signal or a control signal through an antenna using wireless communication. Moreover, the antenna may be in common use for transmission and reception. The transmission unit 21 transmits the uplink signal, for example, through the uplink data channel or the control channel. The uplink physical data channels, for example, include the individual data channel, the Physical Uplink Shared Channel (PUSCH). Furthermore, the uplink physical control channels, for example, include the individual control channel, the Physical Uplink Control Channel (PUCCH). The signals that are transmitted, for example, include the L1/L2 control signal that is transferred to the wireless base station 10 that makes a connection, on an individual control channel, the user data signal that is transferred to the wireless base station 10 that makes a connection, on the individual data channel, or the radio resource control (RRC) control signal. Furthermore, the signals that are transmitted, for example, include a reference signal that is used for channel estimation or demodulation.

As a specific example of the signal that is transmitted by the transmission unit 21, each signal that is transmitted by each wireless terminal 20 in FIGS. 1 to 7 or in FIGS. 11 to 17 may be given. Specifically, the transmission unit 21 can transmit the transmission that is based on the uplink SPS in FIGS. 1, 2, 7, 11 to 13, and 15 to 17, to the wireless base station 10 over the PUSCH. The transmission unit 21 can transmit the uplink transmission in FIGS. 5 and 6 to the wireless base station 10. The transmission unit 21 can transmit the transmission completion notification in FIGS. 12 and 13, for example, to the wireless base station 10 over the PUSCH. The transmission unit 21 can transmit the uplink data transmission in FIG. 13, for example to the wireless base station 10 over the PUSCH. The transmission unit 21 can transmit the extension request in FIGS. 15 and 17, for example, to the wireless base station 10 over the PUCCH.

The reception unit 22 receives the data signal or the control signal that is transmitted from the wireless base station 10 using the wireless communication through the antenna. The reception unit 22 receives the downlink signal, for example, through the downlink data channel or the control channel. The downlink physical data channels include the individual data channel, the Physical Downlink Shared Channel (PDSCH). Furthermore, the downlink physical control channels include the individual control channel, the Physical Downlink Control Channel (PDCCH). The signals that are received, for example, include the L1/L2 control signal that is transferred from the wireless base station 10 that makes a connection, on the individual control channel, the user data signal that is transferred from the wireless base station 10 that makes a connection, on the individual data channel, or the radio resource control (RRC) control signal. Furthermore, the signals that are received, for example, include the reference signal that is used for the channel estimation or the demodulation.

As a specific example of the signal that is received by the reception unit 22, each signal that is received by each wireless terminal 20 in FIGS. 1 to 7, or in FIGS. 11 to 17 may be given. Specifically, the reception unit 22 can receive from the wireless base station 10 the SPS parameter notification in FIGS. 1, 3, 7, and 7 using the RRC signaling over the PDSCH. The reception unit 22 can receive from the wireless base station 10 the SPS activation and the SPS release in FIGS. 1 to 4, and 11 over the PDCCH. The reception unit 22 can receive from the wireless base station 10 the transmission that is based on the downlink SPS in FIGS. 3, 4, and 14 over the PDSCH. The reception unit 22 can receive the transmission parameter notification in FIG. 5 from the wireless base station 10. The reception unit 22 can receive the UL grant in FIG. 13 from the wireless base station 10 over the PDCCH. The reception unit 22 can receive the transmission completion notification in FIG. 14, for example, from the wireless base station 10 over the PDCCH or the PDSCH. The reception unit 22 can receive the DCI in FIG. 14 from the wireless base station 10 over the PDCCH. The reception unit 22 can receive the downlink data transmission in FIG. 14 from the wireless base station 10 over the PDSCH. The reception unit 22 can receive the extension response in FIGS. 15 and 17, for example, from the wireless base station 10 over the PDCCH.

The control unit 23 outputs data or control information that is transmitted, to the transmission unit 21. The control unit 23 inputs the data or the control information that is received, into the reception unit 22. The control unit 23 acquires the data or the control information from the network device 3 or the different wireless base station through a wired connection or a wireless connection. In addition to these, the control unit performs various control tasks relating to various transmitted signals that are transmitted by the transmission unit 21, or various received signals that are received by the reception unit 22.

As a specific example of the processing that is controlled by the control unit 23, various processing tasks that are performed in each wireless terminal 20 in FIGS. 1 to 7 and 11 to 17 may be given. Specifically, the control unit 23 can control the processing that receives the SPS parameter notification in FIGS. 1, 3, and 7. The control unit 23 can control processing that receives the SPS activation and the SPS release in FIGS. 1 to 4, 7, and 11. The control unit 23 can control reception processing that is based on the downlink SPS in FIGS. 3, 4, and 14. The control unit 23 can control processing that receives the transmission parameter notification in FIG. 5. The control unit 23 can control processing that receives the UL grant in FIG. 13. The control unit 23 can control processing that receives the transmission completion notification in FIG. 14. The control unit 23 can control processing that receives the DCI in FIG. 14. The control unit 23 can control processing that receives the downlink data transmission in FIG. 14. The control unit 23 can control processing that receives the extension response in FIGS. 15 and 17. The control unit 23 can control transmission processing that is based on the uplink SPS in FIGS. 1, 2, 7, 11 to 13, and 15 to 17. The control unit 23 can control processing that transmits the uplink transmission in FIGS. 5 and 6. The control unit 23 can control processing that transmits the transmission completion notification in FIGS. 12 and 13. The control unit 23 can control processing that transmits the uplink data transmission in FIG. 13. The control unit 23 can control processing that transmits the extension request in FIGS. 15 and 17.

[Hardware Configuration of Each Device in a Wireless Communication System According to Each Embodiment]

Figure 21:
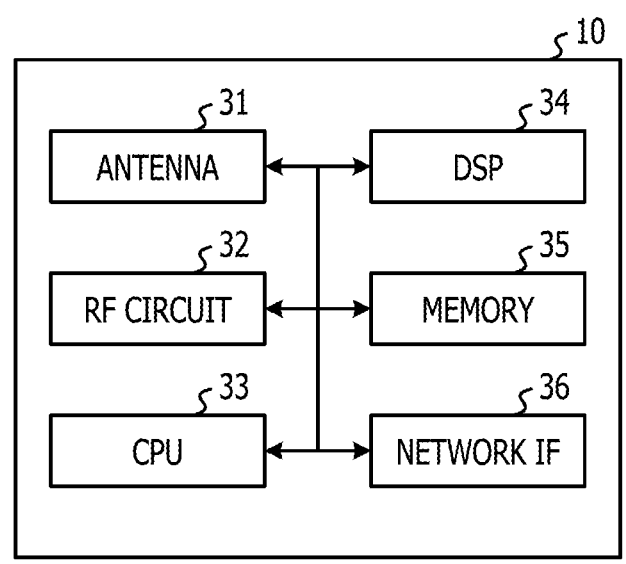
FIG. 21 is a diagram illustrating a hardware configuration of the wireless base station according to each embodiment.
Figure 22:
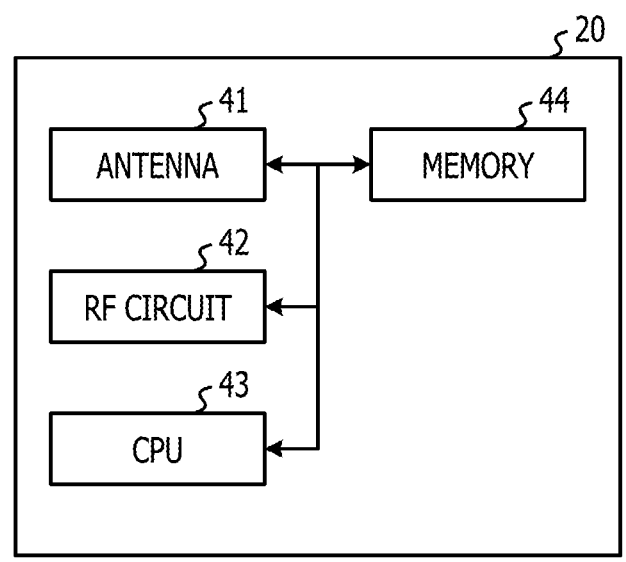
FIG. 22 is a diagram illustrating a hardware configuration of the wireless terminal according to each embodiment.

Referring to FIGS. 21 and 22, a hardware configuration of each device in wireless communication systems according to each embodiment and according to each modification example will be described.

FIG. 21 is a diagram illustrating a hardware configuration of the wireless base station 10. As illustrated in FIG. 21, the wireless base station 10 includes a radio frequency (RF) circuit 32 including, for example, an antenna 31, a central processing unit (CPU) 33, a digital signal processor (DSP) 34, a memory 35, and a network interface (IF) 36, as hardware constituent elements. The CPU is connected in such a manner that it is possible to input and output various signals or data through a bus. The memory 35 includes at least any one of a random access memory (RAM), for example, such as a synchronous dynamic random access memory (SDRAM), a read only memory (ROM), and a flash memory. A program, control information, or data is stored in the memory 35.

A correspondence between a functional configuration of the wireless base station 10 that is illustrated in FIG. 19 and a hardware configuration of the wireless base station 10 that is illustrated in FIG. 21 will be described. The transmission unit 11 and the reception unit 12 (or the communication unit 14), for example, are realized by an RF circuit 32, or an antenna 31 and the RF circuit 32. The control unit 13, for example, is realized by the CPU 33, the DSP 34, the memory 35, a digital electronic circuit that is not illustrated, and the like. For example, for example, as the digital electronic circuit, an application-specific integrated circuit (ASIC), a field-programming gate array (FPGA), a large scale integration (LSI), and the like may be provided.

FIG. 22 is a diagram illustrating a hardware configuration of the wireless terminal 20. As illustrated in FIG. 22, the wireless terminal 20 includes an RF circuit 42 including, for example, an antenna 41, a CPU 43, and a memory 44, as hardware constituent elements. Additionally, the wireless terminal 20 may include a display device, such as a liquid crystal display (LCD), which is connected to the CPU 43.

The memory 44 includes at least any one of a RAM, for example, such as an SDRAM, a ROM, and a flash memory. A program, control information, or data is stored in the memory 44.

A correspondence between a functional configuration of the wireless terminal 20 that is illustrated in FIG. 20 and a hardware configuration of the wireless terminal 20 that is illustrated in FIG. 22 will be described. The transmission unit 21 and the reception unit 22 (or the communication unit 24), for example, are realized by an RF circuit 42, or an antenna 41 and the RF circuit 42. The control unit 23, for example, is realized by the CPU 43, the memory 44, a digital electronic circuit that is not illustrated, and the like. As the digital electronic circuit, for example, an ASIC, an FPGA, an LSI, and the like may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal comprising:
a memory configured to store a plurality of instructions; and
a processor coupled to the memory, configured to support scheduling feature while at least a mobility feature is not supported, and configured to execute the plurality of instructions to:
communicate with a wireless base station using a wireless signal that is divided into sequential time segments,
receive first information that is Radio Resource Control (RRC) information from the wireless base station, the first information including a length of a period for periodic wireless communication that is performed using the wireless signal, the length of the period being a specified number of time segments in the sequential time segments, and
perform the periodic wireless communication with the wireless base station based on the first information,
wherein the first information includes second information and third information, the second information indicating, by a bitmap, a plurality of first time segments within one cycle of the period for the periodic wireless communication, each of the plurality of first time segments being a radio resource allocated for the wireless terminal in the periodic wireless communication, the bitmap having a bit length corresponding to the length of the one cycle of the period for the periodic wireless communication, wherein each bit in the bitmap corresponds to a pattern indicating a time location at which each of the plurality of first time segments is allocated for the wireless terminal, wherein the third information is offset information indicating a timing of initial transmission of the plurality of first time segments.

2. The wireless terminal according to claim 1, wherein the processor is further configured to transmit, when the wireless terminal does not use a latter part of the allocated radio resource within the period, a notification signal to the wireless base station, the notification signal being a buffer status report (BSR) signal that indicates an amount of uplink data.

3. The wireless terminal according to claim 2, wherein when the notification signal represents that the amount of uplink data is zero, the notification signal is configured to cause the wireless base station, upon receiving the notification signal from the wireless terminal, to allocate at least part of the latter part of the allocated radio resource, to another wireless terminal.

4. The wireless terminal according to claim 3, wherein the allocated at least part of the latter part comprises at least one time segment that is needed for the another wireless terminal to transmit data.

5. The wireless terminal according to claim 2, wherein the processor is configured to transmit the notification signal using a part of the allocated radio resource.

6. The wireless terminal according to claim 1, wherein the processor is configured, when a response signal is an acknowledgement (ACK) signal, to suppress transmission of the ACK signal, except for transmission of the ACK signal in an end of the allocated radio resource.

7. The wireless terminal according to claim 6, wherein the processor is further configured not to suppress, when the response signal is a negative-acknowledgement (NACK) signal, transmission of the NACK signal.

8. The wireless terminal of claim 1, wherein the second information is a length of the first time segments within the one cycle of the period for wireless communication.

9. The wireless terminal according to claim 1, wherein the first information further includes fourth information, the fourth information indicating a number of periodic transmissions.

10. A wireless base station comprising:
a memory configured to store a plurality of instructions; and
a processor coupled to the memory and the processor configured to:
communicate with a wireless terminal using a wireless signal that is divided into sequential time segments, the wireless terminal being configured to support scheduling feature while at least a mobility feature is not supported,
transmit first information that is Radio Resource Control (RRC) information to the wireless terminal, the first information including a length of a period for periodic wireless communication that is performed using the wireless signal, the length of the period being a specified number of time segments in the sequential time segments, and
perform the periodic wireless communication with the wireless terminal based on the first information,
wherein the first information includes second information and third information, the second information indicating, by a bitmap, a plurality of first time segments within one cycle of the period for the periodic wireless communication, each of the plurality of first time segments being a radio resource allocated for the wireless terminal in the periodic wireless communication, the bitmap having a bit length corresponding to the length of the one cycle of the period for the periodic wireless communication, wherein each bit in the bitmap corresponds to a pattern indicating a time location at which each of the plurality of first time segments is allocated for the wireless terminal, wherein the third information is offset information indicating a timing of initial transmission of the plurality of first time segments.

11. The wireless base station according to claim 10, wherein the processor is further configured to receive, when the wireless terminal does not use a latter part of the allocated radio resource within the period, a notification signal from the wireless terminal,
wherein the notification signal is a buffer status report (BSR) signal that indicates an amount of uplink data.

12. The wireless base station according to claim 11, wherein when the notification signal represents that the amount of uplink data is zero, the processor is configured, upon receiving the notification signal from the wireless terminal, to allocate at least part of the latter part of the allocated radio resource, to another wireless terminal.

13. The wireless base station according to claim 12, wherein
the allocated at least part of the latter part comprises at least one time segment that is needed for the another wireless terminal to transmit data.

14. The wireless base station according to claim 11, wherein
the processor is configured to receive the notification signal using a part of the allocated radio resource.

15. The wireless base station according to claim 10, wherein
the wireless terminal is configured, when a response signal is an acknowledgement (ACK) signal, to suppress transmission of the ACK signal, except for transmission of the ACK signal in an end of the allocated radio resource.

16. The wireless base station of claim 10, wherein the second information is a length of the first time segments within the one cycle of the period for wireless communication.

17. A wireless communication system comprising:
a wireless base station; and
a wireless terminal configured to:
communicate with the wireless base station using a wireless signal that is divided into sequential time segments, the wireless terminal being configured to support scheduling feature while at least a mobility feature is not supported,
receive first information that is Radio Resource Control (RRC) information from the wireless base station, the first information including a length of a period for periodic wireless communication that is performed using the wireless signal, the length of the period being a specified number of time segments in the sequential time segments, and
perform the periodic wireless communication with the wireless base station based on the first information,
wherein the first information includes second information and third information, the second information indicating, by a bitmap, a plurality of first time segments within one cycle of the period for the periodic wireless communication, each of the plurality of first time segments being a radio resource allocated for the wireless terminal in the periodic wireless communication, the bitmap having a bit length corresponding to the length of the one cycle of the period for the periodic wireless communication, wherein each bit in the bitmap corresponds to a pattern indicating a time location at which each of the plurality of first time segments is allocated for the wireless terminal, wherein the third information is offset information indicating a timing of initial transmission of the plurality of first time segments.

18. The wireless communication system of claim 17, wherein
the second information is a length of the first time segments within the one cycle of the period for wireless communication.

19. A wireless communication method by a wireless terminal, the wireless communication method comprising:
supporting scheduling feature while at least a mobility feature is not supported;
communicating with a wireless base station using a wireless signal that is divided into sequential time segments;
receiving first information that is Radio Resource Control (RRC) information from the wireless base station, the first information including a length of a period for periodic wireless communication that is performed using the wireless signal, the length of the period being a specified number of time segments in the sequential time segments; and
performing the periodic wireless communication with the wireless base station based on the first information, wherein the first information includes second information and third information, the second information indicating, by a bitmap, a plurality of first time segments within one cycle of the period for the periodic wireless communication, each of the plurality of first time segments being a radio resource allocated for the wireless terminal in the periodic wireless communication, the bitmap having a bit length corresponding to the length of the one cycle of the period for the periodic wireless communication, wherein each bit in the bitmap corresponds to a pattern indicating a time location at which each of the plurality of first time segments is allocated for the wireless terminal, wherein the third information is offset information indicating a timing of initial transmission of the plurality of first time segments.

20. The wireless communication method of claim 19, wherein
the second information is a length of the first time segments within the one cycle of the period for wireless communication.

* * * * *